US012212153B2

(12) United States Patent
Ganesh et al.

(10) Patent No.: US 12,212,153 B2
(45) Date of Patent: Jan. 28, 2025

(54) WIRELESS POWER FOR A VARIABLE LOAD

(71) Applicant: GE Intellectual Property Licensing, LLC, Niskayuna, NY (US)

(72) Inventors: Jayanti Ganesh, Bangalore (IN); Viswanathan Kanakasabai, Bangalore (IN); Suma Memana Narayana Bhat, Bangalore (IN); Joginder Yadav, Bangalore (IN)

(73) Assignee: Dolby Laboratories Inc., San Francisco, CA (US)

( * ) Notice: Subject to any disclaimer, the term of this patent is extended or adjusted under 35 U.S.C. 154(b) by 0 days.

(21) Appl. No.: 18/041,028

(22) PCT Filed: Aug. 9, 2021

(86) PCT No.: PCT/US2021/045266
§ 371 (c)(1),
(2) Date: Feb. 8, 2023

(87) PCT Pub. No.: WO2022/035780
PCT Pub. Date: Feb. 17, 2022

(65) Prior Publication Data
US 2023/0275464 A1    Aug. 31, 2023

(30) Foreign Application Priority Data

Aug. 10, 2020   (IN) .............................. 202011034348

(51) Int. Cl.
*H02J 50/12*     (2016.01)
*H02J 50/80*     (2016.01)
(52) U.S. Cl.
CPC .............. *H02J 50/12* (2016.02); *H02J 50/80* (2016.02)

(58) Field of Classification Search
CPC ............. H02J 50/12; H02J 50/80; H02J 50/10
See application file for complete search history.

(56) References Cited

U.S. PATENT DOCUMENTS

| 8,295,396 B2 | 10/2012 | Waheed et al. |
| 10,536,035 B2 | 1/2020 | Joye et al. |
| (Continued) | | |

FOREIGN PATENT DOCUMENTS

| EP | 3644475 | 4/2020 |
| WO | 2015181817 | 12/2015 |
| WO | 2022035780 | 2/2022 |

OTHER PUBLICATIONS

"PCT Application No. PCT/US2021/045266 International Search Report and Written Opinion", Nov. 25, 2021, 16 pages.

(Continued)

*Primary Examiner* — Ryan Johnson
(74) *Attorney, Agent, or Firm* — DeLizio, Peacock, Lewin & Guerra, LLP

(57) ABSTRACT

This disclosure provides systems, methods and apparatuses for wireless power transmission and reception. A wireless power transmission apparatus may include a primary coil that transmits power to a corresponding secondary coil in a wireless power reception apparatus. The wireless power transmission apparatus may configure characteristics of the wireless power transmission based on a load setting of a wireless power reception apparatus. The wireless power transmission apparatus may take into account a coupling factor and power transfer characteristics of the wireless power reception apparatus in determining a configuration of the wireless power transmission from the wireless power transmission apparatus to the wireless power reception apparatus. In some implementations, a change in wireless power transmission may occur based on a corresponding change in the load. For example, the change in wireless power trans- (Continued)

mission and the corresponding change in the load may occur in relation to a synchronization event.

34 Claims, 11 Drawing Sheets

(56) References Cited

U.S. PATENT DOCUMENTS

| | | |
|---|---|---|
| 10,637,295 B2 | 4/2020 | Mao |
| 2016/0036241 A1 | 2/2016 | Eckerson et al. |
| 2017/0133887 A1 | 5/2017 | Tominaga et al. |
| 2017/0149286 A1* | 5/2017 | Joye ............... H04B 5/263 |
| 2019/0068004 A1* | 2/2019 | Louis ............... H02J 50/12 |

OTHER PUBLICATIONS

Gunji, et al., "Novel Transmitting Power Control Method without Signal Communication for Wireless Power Transfer via Magnetic Resonance Coupling", Electrical Engineering in Japan, vol. 199, No. 3, 2017, 2017, 13 pages.

Tavakoli, et al., "Design of A Dual-Loop Controller for In-Motion Wireless Charging of An Electric Bus", 2016 IEEE Energy Conversion Congress and Exposition (ECCE), Sep. 18-22, 2016, Sep. 2016, 8 pages.

\* cited by examiner

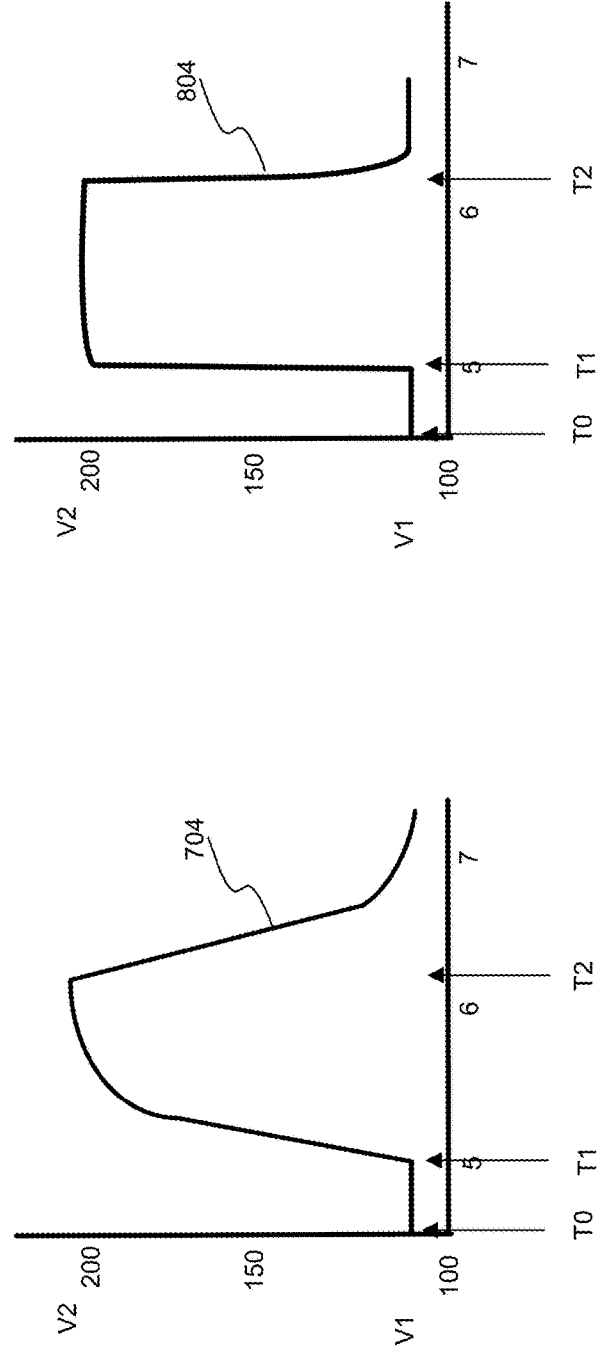

WIRELESS POWER FOR A VARIABLE LOAD

CROSS-REFERENCE TO RELATED APPLICATIONS

This application is the National Stage of International Application No. PCT/US2021/045266, filed Aug. 9, 2021, which claims the priority benefit of India patent Application Number 202011034348, filed Aug. 10, 2020, entitled "WIRELESS POWER FOR A VARIABLE LOAD," the contents of each of which are hereby incorporated by reference.

TECHNICAL FIELD

This disclosure relates generally to wireless power. More specifically, this application relates to a wireless power transmission apparatus and a wireless power reception apparatus.

DESCRIPTION OF RELATED TECHNOLOGY

Some wireless power systems utilize wireless power technology to wirelessly provide power to cordless appliances, such as some types of blenders, kettles, mixers, etc. In these wireless power systems, a wireless power transmission apparatus may be placed on a countertop or other flat surface, and a wireless power reception apparatus may be included in a cordless appliance. The wireless power transmission apparatus may include a primary coil that produces an electromagnetic field that may induce a voltage in a secondary coil of the wireless power reception apparatus when the secondary coil is placed in proximity to the primary coil. In this configuration, the electromagnetic field may wirelessly transfer power to the secondary coil. The power may be transferred using inductive coupling or resonant coupling between the primary coil and the secondary coil. The wireless power reception apparatus may provide the received power to operate the cordless appliance.

SUMMARY

The systems, methods, and apparatuses of this disclosure each have several innovative aspects, no single one of which is solely responsible for the desirable attributes disclosed herein.

One innovative aspect of the subject matter described in this disclosure can be implemented as a method for wireless power transmission. In some implementations, the method may include receiving, at a first time, information indicating at least a load setting associated with a variable load of a wireless power reception apparatus. The method also may include determining an operating control parameter for a wireless power transmission apparatus based, at least in part, on the load setting. The method also may include modifying, at a second time, an amount of wireless power transmitted by the wireless power transmission apparatus based, at least in part, on the operating control parameter, wherein the second time is relative to a synchronization event after the first time.

In some implementations, the information indicating at least a load setting is received by a communication coil of the wireless power transmission apparatus.

In some implementations, the method may further include transmitting, at a third time, the wireless power from at least a first primary coil of the wireless power transmission apparatus to at least a first secondary coil of the wireless power reception apparatus.

In some implementations, the third time is before the first time.

In some implementations, determining an operating control parameter may further include determining an estimated operating control parameter based, at least in part, on the information indicating at least the load setting associated with a variable load of a wireless power reception apparatus. Determining an operating control parameter may further include modifying the estimated control parameter based, at least in part, on a difference between a reference voltage indicating a voltage required by the variable load of the wireless power reception apparatus and a load voltage indicating a voltage available to the variable load, wherein the modified estimated control parameter is the operating control parameter.

In some implementations, the operating control parameter indicates an estimated frequency for the wireless power.

In some implementations, the operating control parameter indicates a duty cycle at an operating frequency for the wireless power.

In some implementations, the synchronization event occurs in relation to a time when an alternating current (AC) voltage feeding the wireless power transmission apparatus is equal to zero volts.

In some implementations, the method may further include receiving, from the wireless power reception apparatus, information indicating one or more reference control parameters associated with one or more reference coupling factors between the wireless power reception apparatus and a reference wireless power transmission apparatus, at one or more load powers and one or more load voltages of the wireless power reception apparatus. The method may further include receiving, from the wireless power reception apparatus, a reference voltage indicating a voltage required by a load associated with the wireless power reception apparatus, where determining the operating control parameter is based, at least in part, on the information and the reference voltage.

In some implementations, the information was determined via experimental testing on the reference wireless power transmission apparatus.

In some implementations, the method may further include applying a voltage to a primary coil of the wireless power transmission apparatus to induce a received voltage in a secondary coil of the wireless power reception apparatus, wherein a magnitude of the received voltage is smaller than a magnitude of a load voltage of the wireless power reception apparatus. The method may further include receiving, from the wireless power reception apparatus, a received voltage value indicating a received voltage induced in a first secondary coil of the wireless power reception apparatus. The method may further include determining a transmitted voltage value indicating a transmitted voltage amount supplied to a first primary coil of the wireless power transmission apparatus. The method may further include determining an operating coupling factor between the wireless power transmission apparatus and the wireless power reception apparatus based, at least in part, on a ratio of the received voltage value and the transmitted voltage value, where determining the operating control parameter is further based, at least in part on the operating coupling factor.

In some implementations, the load setting indicates a power consumption by the variable load.

In some implementations, the operating control parameter may be further based on information indicating one or more reference control parameters associated with one or more reference coupling factors between the wireless power reception apparatus and a reference wireless power reception apparatus at one or more load powers and one or more load voltages of the wireless power reception apparatus. The operating control parameter may be further based on an operating coupling factor of a secondary coil of the wireless power reception apparatus to a first primary coil of the wireless power transmission apparatus. The operating control parameter may be further based on a power estimate indicating an amount of power needed by the variable load, and a reference voltage indicating amount of voltage needed by the variable load.

In some implementations, determining the operating control parameter may include using the operating coupling factor, power estimate and reference voltage to interpolate and extrapolate the information indicating one or more reference control parameters associated with one or more reference coupling factors at one or more load powers and one or more load voltages of the wireless power reception apparatus.

In some implementations, the first time is after a communication delay associated with the information indicating at least a load setting associated with a variable load of a wireless power reception apparatus.

Another innovative aspect of the subject matter described in this disclosure can be implemented as a method for controlling a wireless power reception apparatus including at least one secondary coil. The method also may include receiving, by the secondary coil, wireless power from at least one corresponding primary coil of a wireless power transmission apparatus. The method also may include transmitting, information indicating a load setting associated with a variable load of the wireless power reception apparatus. The method also may include modifying, in response to a synchronization event, an amount of wireless power consumed by the variable load based, at least in part, on the load setting.

In some implementations, the method also may include transmitting, to the wireless power transmission apparatus, information indicating one or more reference control parameters associated with one or more reference coupling factors of the wireless power reception apparatus to a reference wireless power transmission apparatus at one or more load powers and one or more load voltages of the wireless power reception apparatus. The method also may include transmitting, to the wireless power transmission apparatus, a reference voltage indicating a voltage required by a load associated with the wireless power reception apparatus. The method also may include transmitting, to the wireless power transmission apparatus, a measured load voltage indicating a voltage available to the load.

In some implementations, the synchronization event occurs in relation to a time when an alternating current (AC) voltage feeding the wireless power transmission apparatus is equal to zero volts.

In some implementations, the method also may include transmitting, to the wireless power transmission apparatus, a received voltage value indicating a received voltage induced in at least one secondary coil of the wireless power reception apparatus.

In some implementations, the received voltage induced in the secondary coil of the wireless power reception apparatus corresponds to a voltage applied to a primary coil in the wireless power transmission apparatus, wherein a magnitude of the received voltage is smaller than a magnitude of a load voltage of the wireless power reception apparatus.

Another innovative aspect of the subject matter described in this disclosure can be implemented as a method for controlling a wireless power transmission apparatus. The method may include controlling, by a power controller, transmission of wireless power from one or more primary coils of the wireless power transmission apparatus to one or more secondary coils of a wireless power reception apparatus. The method also may include receiving, from the wireless power reception apparatus, information indicating one or more reference control parameters of the wireless power reception apparatus associated with one or more reference coupling factors between the wireless power reception apparatus and a reference wireless power transmission apparatus, at one or more load powers and one or more load voltages of the wireless power reception apparatus. The method also may include receiving, from the wireless power reception apparatus, second information indicating one or more peak voltages induced in a secondary coil of the wireless power reception apparatus. The method also may include determining, by the power controller, an operating coupling factor for the wireless power reception apparatus based, at least in part on the second information. The method also may include determining, by the power controller, an estimated load power for a load setting associated with the wireless power reception apparatus. The method also may include receiving, from the wireless power reception apparatus, a reference voltage indicating a voltage requested by the load. The method also may include determining, by the power controller, an operating control parameter based, at least in part, on the information received from the wireless power reception apparatus, the operating coupling factor, the estimated load power, and the reference voltage. The method also may include modifying, by the power controller, the wireless power in response to a synchronization event based, at least in part, on the control information.

In some implementations, the method also may include receiving, from the wireless power reception apparatus, a measured load voltage indicating a voltage available to the load. The method also may include determining a voltage error based on a difference between the reference voltage and the measured load voltage, and modifying the control information based, at least in part, on the voltage error.

Another innovative aspect of the subject matter described in this disclosure can be implemented as a computer-readable medium having stored therein instructions which, when executed by a processor, causes the processor to perform any one of the above-mentioned functionalities.

Another innovative aspect of the subject matter described in this disclosure can be implemented as a system having means for implementing any one of the above-mentioned functionalities.

Another innovative aspect of the subject matter described in this disclosure can be implemented as an apparatus having one or more processors configured to perform one or more operations from any one of the above-mentioned methods.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 7 illustrates example voltage graphs associated with a wireless power system implementing a traditional feedback control technique.

FIG. 8 illustrates example voltage graphs associated with a wireless power system that implements power control according to some implementations of this disclosure.

Figure 1:
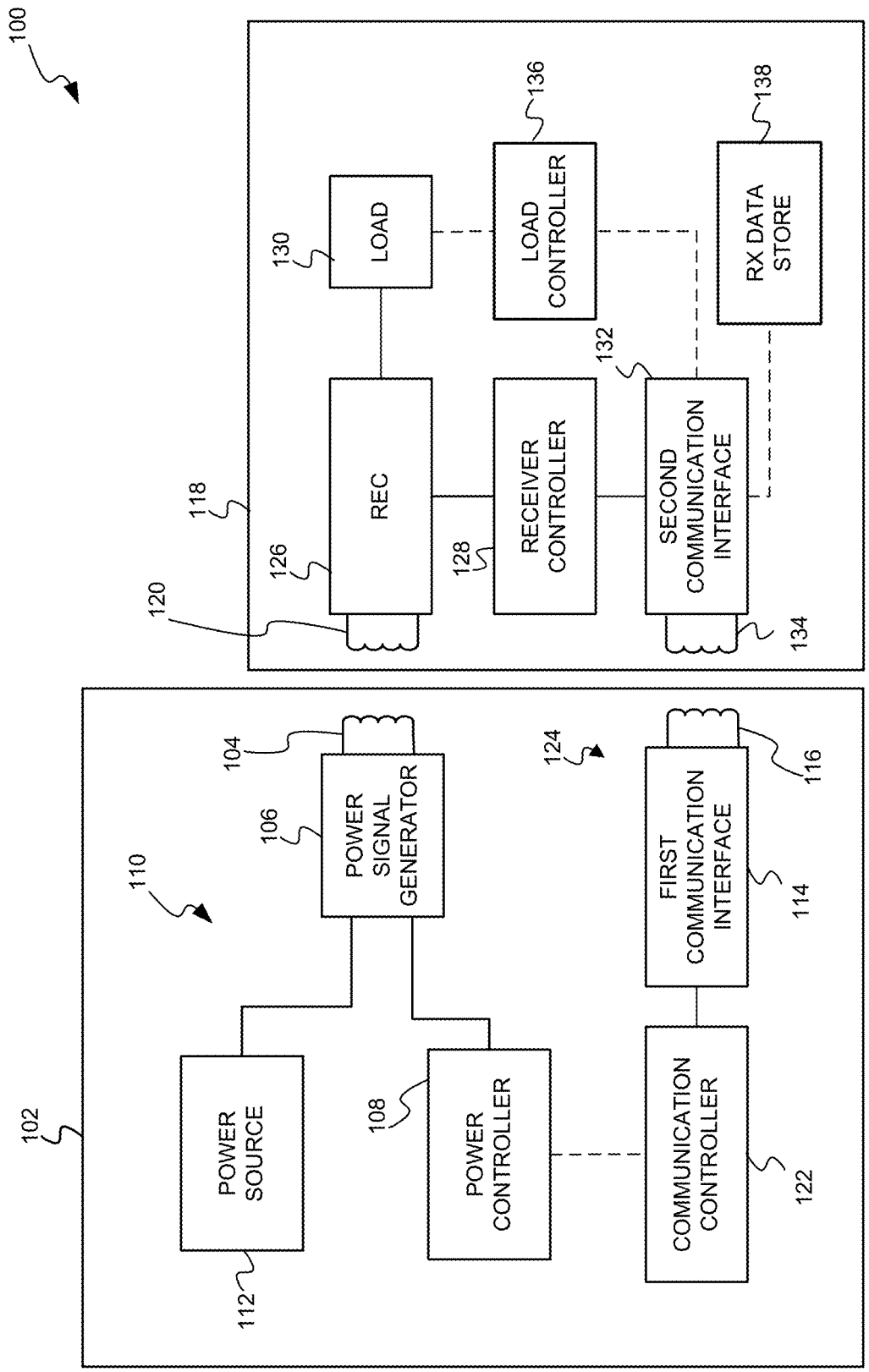
FIG. 1 shows a block diagram of an example wireless power system that includes an example wireless power transmission apparatus and an example wireless power reception apparatus.

Note that the relative dimensions of the figures may not be drawn to scale.

DETAILED DESCRIPTION

The following description is directed to certain implementations for the purposes of describing innovative aspects of this disclosure. However, a person having ordinary skill in the art will readily recognize that the teachings herein can be applied in a multitude of different ways. The described implementations can be implemented in any means, apparatus, system, or method for transmitting or receiving wireless power.

A traditional cordless kitchen system may include a wireless power transmission apparatus integrated with or otherwise disposed on a flat surface. The traditional cordless kitchen system also may include a cordless appliance that includes a wireless power reception apparatus. The wireless power transmission apparatus may include a primary coil that transmits wireless energy (as a wireless power signal) to a corresponding secondary coil in the wireless power reception apparatus. A primary coil refers to a source of wireless energy (such as inductive or magnetic resonant energy) in the wireless power transmission apparatus. A secondary coil located in the wireless power reception apparatus may receive the wireless energy and utilize it to charge or power a cordless appliance. For example, a cordless blender may be placed in proximity to a primary coil of a wireless power transmission apparatus. For example, the wireless power transmission apparatus may include a countertop-mounted primary coil or a primary coil that is embedded or manufactured in a surface on which the cordless blender can be placed. The cordless blender may wirelessly receive power from the primary coil and provide the power to a motor.

Wireless power transmission is more efficient when the primary and secondary coils are closely positioned. Conversely, the efficiency may decrease (or the charging may cease) when the primary and secondary coils are misaligned. When properly aligned, primary coils and secondary coils can transfer wireless energy up to an amount predetermined by a wireless standard. For example, with proper alignment, a primary coil may convey power ranging from 30 Watts (W) up to 2.2 Kilowatts (KW). Because alignment affects the amount of power conveyed, the wireless power transmission apparatus may modify the amount of wireless power based on its alignment with the wireless power reception apparatus.

Different cordless appliances have different load types, different load settings, and different power requirements. For example, a cordless blender may include a variable motor load that has multiple user-selectable load settings to control motor speed. Depending on the load setting, the cordless blender may require 100 W to 600 W. In contrast, a cordless kettle may include a resistive load that has three load settings to control temperature. Depending on the load setting, the cordless kettle may require up to 1.5 KW. Furthermore, cordless appliances may exhibit different levels of voltage gains from a primary coil to a receiver coil at different primary coil excitation frequencies (such as a wireless power transfer frequency) depending on their load type, load setting and alignment with a wireless power transmission apparatus (also referred to as coupling factor). Voltage gain may be measured in terms a ratio of voltage received by a secondary coil to voltage applied at a primary coil. For example, to achieve a desired load voltage, a cordless blender may operate best at a first operating frequency for a first load setting, such as a low motor speed setting. However, as the load setting changes, the cordless blender may not achieve the same load voltage when operated at the first operating frequency. For example, the first operating frequency may facilitate a first voltage gain when the cordless blender is set to a first load setting (such as a low-speed setting), but the first operating frequency may provide a lower voltage gain when the cordless blender is set to a second setting (such as a higher-speed setting). Furthermore, the cordless blender may exhibit different voltage gains at different operating frequencies at different coupling factors. To maintain load voltage, the wireless power transmission apparatus may modify the frequency (or other characteristics) of the wireless power based on a load setting, an operating coupling factor, or other conditions. Because load types, load settings, and power requirements vary widely between cordless devices, wireless power transmission apparatuses may modify voltage output (such as by modifying frequency, duty cycle or voltage) to achieve desired load voltage.

As described herein, some cordless appliances have user-selectable load settings. A user may select a first load setting to start-up a cordless appliance. While the cordless appliance is operating at the first load setting, the user may select a second load setting that requires more or less power. Absent the techniques in this disclosure, the wireless power reception apparatus may immediately begin consuming a different amount of power in response to a change in the load setting. However, there may be some delay before the wireless power transmission apparatus can provide the amount of power required by the wireless power reception apparatus. These delays may cause low voltage conditions, over voltage conditions, hardware damage or failure, and other faults in the cordless appliance.

This disclosure provides systems, methods and apparatuses for wireless power transmission and reception. Various implementations relate generally to a wireless power transmission apparatus including a primary coil that transmits power to a corresponding secondary coil in a wireless power reception apparatus. In some implementations, a wireless power transmission apparatus may configure characteristics of the wireless power transmission based on a load setting of a wireless power reception apparatus. The wireless power transmission apparatus also may take into account coupling factors, power transfer characteristics of the wireless power reception apparatus, load changes, or any combination thereof in determining a configuration of the wireless power transmission from the wireless power transmission apparatus to the wireless power reception apparatus. In some implementations, a change in wireless power transmission may occur based on a corresponding change in the load. In some implementations, the change in wireless power transmission and the corresponding change in the load may occur in relation to a synchronization event.

In some implementations, a power controller in the wireless power transmission apparatus may configure characteristics of the wireless power based on information received from a wireless power reception apparatus. In some implementations, the information indicates one or more reference control parameters such as operating frequencies at different reference coupling factors, load voltages and load powers of the wireless power reception apparatus. For example, the reference coupling factors may be based on experimentally obtained data when the wireless power reception apparatus is powered by a reference wireless power transmission apparatus under one or more reference coupling factors (based on alignment between the wireless reception apparatus and reference wireless power transmission apparatus), at one or more load powers and one or more load voltages of the wireless power reception apparatus. An operating coupling factor refers to a coupling factor based on an actual alignment between the wireless power reception apparatus and the wireless power transmission apparatus (different from the reference wireless power transmission apparatus) that is currently providing wireless power. The reference coupling factors may indicate data points under various reference operating conditions and can be interpolated or extrapolated even if the operating coupling factor is not exactly the same as the reference coupling factors. Thus, the power controller may use this information to determine one or more operating control parameters used for providing wireless power that has particular characteristics, such as a particular frequency, duty cycle, voltage, etc. By using the information to determine characteristics of the wireless power transferred to the wireless power reception apparatus, the power controller also may provide wireless power that enables relatively efficient operation of the wireless power reception apparatus. For example, the power controller may configure the wireless power to enable the wireless power reception apparatus to operate at peak efficiency for a particular load setting, load voltage and operating coupling factor.

In some implementations, the power controller may respond to a load setting change by synchronously coordinating a power modification with the wireless power reception apparatus. The load setting may indicate that a user has selected a different speed setting for a motor load, a different temperature setting for a resistive load or otherwise changed a user-selectable load setting on a cordless appliance. If a load setting changes for a variable load associated with the wireless power reception apparatus, the power controller may need to modify the wireless power to accommodate the new load setting. The power controller may modify the frequency, duty cycle, voltage or any other suitable characteristic of the wireless power. The power controller may synchronously coordinate with the wireless power reception apparatus so that the power controller commences transmission of the modified wireless power substantially contemporaneously with the wireless power reception apparatus commencing consumption of the modified wireless power. Such synchronous coordination may avoid delays in meeting power requirements of the wireless power reception apparatus. By avoiding these delays, the power controller may enable the wireless power reception apparatus to respond more quickly to load setting changes and avoid fault conditions that may that strain cordless appliances and degrade user experiences.

In some implementations, the power controller may modify one or more operating control parameters used for providing the wireless power based on information received from the wireless power reception apparatus. The information may include a load setting, an estimated power needed by the variable load, voltage information for determining an operating coupling factor and a reference voltage indicating a voltage needed by the variable load. The power controller may use some or all of the information to determine an operating control parameter with which to modify the wireless power. In some implementations, the power controller may commence transmission of the modified wireless power in response to any suitable synchronization event, such as when an alternating current (AC) feeding the power controller crosses zero volts.

Various implementations also relate generally to a wireless power reception apparatus including a secondary coil that receives power from a corresponding primary coil of a wireless power transmission apparatus. In some implementations, a load controller of the wireless power reception apparatus may synchronously coordinate power changes with the wireless power transmission apparatus. As previously noted, a load setting may change for a variable load associated with the wireless power reception apparatus. In response to the load setting change, the load controller may notify the wireless power transmission apparatus of the load setting. Instead of immediately drawing a modified amount of power from the wireless power transmission apparatus, the load controller may wait for a synchronization event before drawing the modified amount of power from the wireless power transmission apparatus. By waiting for the synchronization event, the load controller can coordinate with the wireless power transmission apparatus to substantially contemporaneously draw the modified power at approximately the same time the wireless power transmission apparatus transmits the modified power.

The techniques of this disclosure may enable a wireless power transmission apparatus to estimate an operating control parameter faster than a wireless power transmission apparatus that does not implement the disclosed techniques. For example, traditional feedback techniques that were designed to modify power after detecting a change in the load. Thus, the traditional feedback technique may cause a delay between a time when a load setting is changed and when the wireless power can be provided to accommodate the new load setting. The delay in wireless power may cause fault conditions that may strain cordless appliances and degrade user experiences. Using the techniques of this disclosure, a wireless power transmission apparatus may estimate an operating control parameter for a particular load setting of the wireless power reception apparatus before the load is actually changed. The wireless power transmission apparatus and the wireless power reception apparatus can coordinate the change in the wireless power transmission and the load, respectively, so that power is available when it is needed to power the load at the load setting.

Particular implementations of the subject matter described in this disclosure can be implemented to realize one or more of the following potential advantages. In some implementations the described techniques can be used to configure a wireless power transmission apparatus to provide, at an appropriate time, wireless power having characteristics (such as a particular frequency, duty cycle, voltage, etc.) that enable a wireless power reception apparatus to operate with relative efficiency. In some implementations, the described techniques can be used to achieve synchronous cooperation between the wireless power transmission apparatus and the wireless power reception apparatus when responding to a change of a load setting. These techniques may avoid delays associated with traditional feedback mechanisms that were designed to facilitate power modification. These techniques also may enhance user experiences by increasing responsiveness to user-selected load settings.

While the examples in this disclosure are based on wireless power used in kitchen systems, the techniques are applicable to other types of systems. For example, the techniques may be used with wireless power systems associated with home appliances, electronic devices, fans, space heaters, speaker systems, air compressors, garden equipment, or components of an electric vehicle, among other examples.

FIG. 1 shows a block diagram of an example wireless power system that includes an example wireless power transmission apparatus and an example wireless power reception apparatus. In FIG. 1, dashed lines represent communications lines to distinguish from solid lines that represent electrical circuit lines.

The wireless power system 100 includes a wireless power transmission apparatus 102 and a wireless power reception apparatus 118. The wireless power transmission apparatus includes a primary coil 104. The primary coil 104 may be associated with a power signal generator 106. The primary coil 104 may be a wire coil which transmits wireless power (which also may be referred to as wireless energy). The primary coil 104 may transmit wireless energy using inductive or magnetic resonant field. The power signal generator 106 may include components (not shown) to prepare the wireless power. For example, the power signal generator 106 may include one or more switches, drivers, series capacitors, rectifiers or other components.

In some implementations, the power signal generator 106, power controller 108 and other components (not shown) may be collectively referred to as a power transmitter circuit 110. Some or all of the power transmitter circuit 110 may be embodied as an integrated circuit (IC) that implements features of this disclosure for controlling and transmitting wireless power to one or more wireless power reception apparatuses. The power controller 108 may be implemented as a microcontroller, dedicated processor, integrated circuit, application specific integrated circuit (ASIC) or any other suitable electronic device.

The power source 112 may provide power to the power transmitter circuit 110 in the wireless power transmission apparatus 102. The power source 112 may convert alternating current (AC) power to direct current (DC) power. For example, the power source 112 may include a converter that receives an AC power from an external power supply and converts the AC power to a DC power used by the power signal generator 106.

A communication controller 122 is connected to a first communication interface 114. The first communication interface 114 is connected to a first communication coil 116. The communication controller 122 may include logic for controlling one or more switches and other components that cause transmission and reception of wireless signals via the first communication coil 116. In some implementations, the communication controller 122, the first communication interface 114, and the first communication coil 116 may be collectively referred to as the first communication unit 124. In some implementations, the first communication unit 124 may support Near-Field Communication (NFC). NFC is a technology by which data transfer occurs on a carrier frequency of 13.56 Megahertz (MHz). The first communication unit 124 also may support any suitable communication protocol.

The wireless power reception apparatus 118 may include a secondary coil 120, a rectifier 126, a receiver controller 128, a second communication interface 132, a load controller 136, a load 130, and a memory (shown as RX data store 138). Although shown as different components, some components may be packaged or implemented in the same hardware. For example, in some implementations, the receiver controller 128 and the load controller 136 may be implemented as a single controller. The receiver controller 128, the load controller 136, or any combination thereof, may be implemented as a microcontroller, dedicated processor, integrated circuit, application specific integrated circuit (ASIC) or any other suitable electronic device.

The power controller 108 may detect the presence or proximity of a wireless power reception apparatus 118. This detection may happen during a periodic pinging process of the first communication interface 114 in the wireless power transmission apparatus 102. During the pinging process, the first communication interface 114 also may supply power (via the first communication coil 116) to the second communication interface 132 (via the second communication coil 134) when the wireless power reception apparatus 118 is in proximity. The second communication interface 132 may "wake up" and power-up the receiver controller 128 and may send a reply signal back to the first communication interface 114. Prior to power transfer, a handshaking process may take place during which the power controller 108 may receive data related to the power rating of the receiver, the size and the dimensions of the receiver.

During the hand-shaking process, the power controller 108 also may receive information indicating one or more reference control parameters such as operating frequencies of the wireless power reception apparatus 118 at different reference coupling factors, load voltages and load powers of the wireless power reception apparatus 118 when it was operated on a reference wireless power transmitter apparatus. In some implementations, the information may include data (such as interpolation points, vector values, etc.) that enables the power controller 108 to adapt locally stored information to suite various conditions and settings, so the power controller 108 can provide power that enables the wireless power reception apparatus 118 to operate relatively efficiently. In some implementations, the wireless power reception apparatus 118 may provide an empirical formula for computing one or more reference control parameters as a function of a reference coupling factor, a load voltage and a load power.

The format of the information provided by the wireless power reception apparatus 118 may vary in different implementations. For example, the information indicating one or more reference control parameters such as operating frequencies associated with one or more reference coupling factors between the wireless power reception apparatus and a reference wireless power transmission apparatus, at one or more load powers and one or more load voltages of the wireless power reception apparatus may be formatted as a data structure included in a communication from the wireless power reception apparatus 118 to the wireless power transmission apparatus 102. An example data structure may include:

```
RX DATA {
    Array(
        reference control parameter,
        reference coupling factor,
        load voltage,
        power received)
}
``` where the information (RX DATA) includes values for the reference control parameter (such as an operating frequency, duty ratio at a given frequency, or both), reference coupling factor, load voltage, and power received that were obtained during a test of the wireless power reception apparatus 118 on a reference wireless power transmission apparatus. The load voltage and power received indicate a power transfer that the wireless power reception apparatus 118 achieved during a test with the reference wireless power transmission apparatus when the reference control parameter was used at a reference coupling factor between a wireless power transmission apparatus 102 and the reference wireless power reception apparatus. The information may be stored in a memory (shown as RX data store 138) of the wireless power reception apparatus 118. The second communication interface 132 may obtain the information from the RX data store 138 and communicate the information to the first communication unit 124 of the wireless power transmission apparatus 102. In some implementations, the quantity of data points in the array may vary to provide either a fine resolution (more data) or a rough resolution (less data). In some implementations, the RX DATA may be compressed to reduce the size of the communication. For example, the RX DATA may include vectors, adjustment values or other data points which can be used by the wireless power transmission apparatus 102 to reconstruct the information indicating one or more reference control parameters (such as one or more operating frequencies) associated with one or more reference coupling factors between the wireless power reception apparatus and a reference wireless power transmission apparatus, at one or more load powers and one or more load voltages of the wireless power reception apparatus. For example, the RX DATA may include coefficient values, vector values, or other type of compressed data which, when applied to a formula, can enable the wireless power transmission apparatus 102 to determine the reference control parameters such as operating frequencies associated with different reference coupling factors, load voltages, and power.

The power controller 108 also may determine an operating coupling factor associated with the wireless power reception apparatus 118. The power controller 108 may determine the operating coupling factor based on one or more voltages induced in a secondary coil 120 of the wireless power reception apparatus 118 for one or more voltages applied to the primary coil 104, under the conditions when there is no current in the secondary coil 120. The wireless power reception apparatus 118 may provide information indicating the one or more voltages induced in the secondary coil 120 via the first communication unit 124.

The power controller 108 may control characteristics of wireless power it provides to the wireless power reception apparatus 118. After detecting the wireless power reception apparatus 118, the power controller 108 may receive information from a wireless power reception apparatus 118. For example, the power controller 108 may receive the information during a hand shaking process with the wireless power reception apparatus 118. The information may indicate reference control parameters such as operating frequencies of the wireless power reception apparatus 118 at different reference coupling factors, load voltages and load powers of the wireless power reception apparatus 118. The power controller 108 may use this information to determine at least one operating control parameter (such as frequency, duty cycle, voltage, etc.) for wireless power it provides to the wireless power reception apparatus 118. Thus, the power controller 108 may provide wireless power that enables relatively efficient operation of the wireless power reception apparatus 118. For example, the power controller may configure the wireless power to enable the wireless power reception apparatus to operate at peak efficiency for a particular load setting, load voltage and operating coupling factor.

The power controller 108 may respond to a load setting change by synchronously coordinating a power modification with the wireless power reception apparatus 118. The load setting may indicate that a user has selected a different speed setting for a motor load, a different temperature setting for a resistive load or otherwise changed any other suitable user-selectable setting on a cordless appliance. If a load setting changes for a variable load associated with the wireless power reception apparatus, the power controller 108 may need to modify the wireless power to accommodate the change. The power controller 108 may modify the frequency, duty cycle, voltage or any other suitable characteristic of the wireless power. The power controller 108 may synchronously coordinate with the wireless power reception apparatus 118 so that the power controller 108 commences transmission of the modified wireless power substantially contemporaneously to when the wireless power reception apparatus 118 commences consumption of the modified wireless power. Such synchronous coordination may avoid delay in meeting power requirements of the wireless power reception apparatus 118. By avoiding these delays, the power controller 108 may enable the wireless power reception apparatus to avoid fault conditionals that may that strain cordless devices or degrade user experiences. In some implementations, the power controller 108 may modify the wireless power based on information received from the wireless power reception apparatus. The information may include the load setting, an estimated power needed by the variable load, voltage information for determining an operating coupling factor and a reference voltage indicating a voltage needed by the variable load. The power controller 108 may use some or all of the information to determine an operating control parameter by which to modify the wireless power. In some implementations, the power controller 108 may commence transmission of the modified wireless power in response to any suitable synchronization event, such as when an AC power feeding the wireless power transmission apparatus 102 crosses zero volts.

In some implementations, the wireless power reception apparatus 118 may be included in a cordless appliance, such as a cordless blender, cordless kettle, cordless juicer, etc. The wireless power reception apparatus 118 may include a secondary coil 120, a rectifier 126, and a receiver controller 128. When the secondary coil 120 is aligned to the primary coil 104, the secondary coil 120 may generate an induced voltage based on a received wireless power signal from the primary coil 104. A capacitor may be in series between the secondary coil 120 and the rectifier 126. The rectifier 126 may rectify the induced voltage and provide the induced voltage to a load 130. The load 130 may be any suitable load such as a variable motor load, variable resistive load or a variable induction heating load.

A receiver controller 128 may be connected to the rectifier 126 and the second communication interface 132. The second communication interface 132 may contain modulation and demodulation circuits to wirelessly communicate via the second communication coil 134. Thus, the receiver controller 128 may wirelessly communicate with the communication controller 122 via the second communication interface 123 to the first communication interface 114 using NFC communications. Alternatively or additionally, the receiver controller 128 may use load modulation to communicate via an in-band communication link (not shown) that includes the secondary coil 120.

A load controller 136 may be connected to the load 130 and the second communication interface 132. The load controller 136 may detect changes to load settings. For example, the load controller 136 may detect changes to user-selectable load settings, such as temperature selectors and motor speed selectors. The load controller 136 also may determine a load voltage reference and power estimate based on the load setting. The load controller 136 also may provide load settings, power estimates, load voltage references and any other suitable information to the receiver controller 128 or the second communication interface 132 for communication to the wireless power transmission apparatus 102. The receiver controller 128 may additionally determine and provide a load voltage feedback indicating voltage available to the load 130 and coil voltage information related to determining an operating coupling factor. Although the receiver controller 128 and load controller 136 are shown separately, they may be included in the same component of the wireless power reception apparatus 118.

In some implementations, the load controller 136 may synchronously coordinate changes to the wireless power with the wireless power transmission apparatus 102. For some motor loads, the load controller 136 also may control additional hardware (such as switches and drivers) associated with the load (not shown in FIG. 1). In some implementations, these additional switches may be turned on or off to realize a change of load in synchronization with a change to wireless power transmission. As previously noted, a load setting may change for the load 130. In response to the load setting change, the load controller 136 may notify the wireless power transmission apparatus 102 of the load setting change. Instead of immediately drawing an amount of power commensurate with the load setting, the load controller 136 may wait for a synchronization event before configuring the load 130 to draw the modified amount of wireless power. By waiting for the synchronization event, the load controller 136 may coordinate with the wireless power transmission apparatus 102 to substantially contemporaneously commence consumption of the modified wireless power at approximately the same time the wireless power transmission apparatus commences production of the modified power. The synchronization event may be any suitable event such as when the average direct current (DC) voltage (based on the line frequency of the AC mains feeding the wireless power transmission apparatus) after the rectifier 126 is close to a minimum value (such as zero volts). In another example, the synchronization event may correspond to the time when the AC mains voltage feeding the wireless power transmission apparatus crosses zero volts.

In some implementations, the techniques for determining the operating control parameter for wireless power may be performed from the onset of initiating wireless power transmission to a wireless power reception apparatus 118, such as during an initialization phase of the wireless power transmission. In some implementations, the techniques also may be used to determine a new operating control parameter in response to a change in a user-selected load setting of the wireless power reception apparatus.

Figure 2A:
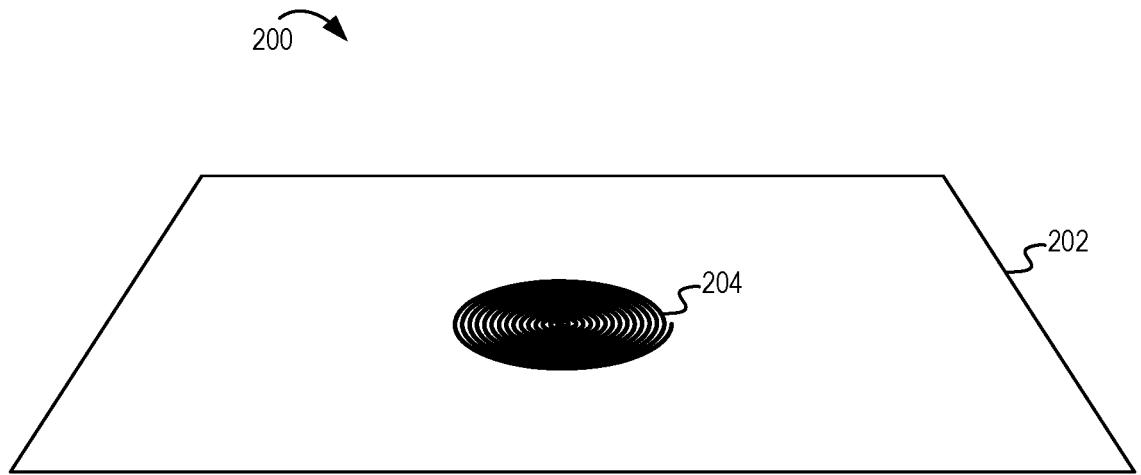
FIG. 2A illustrates a perspective view of an example countertop-mounted wireless power transmission apparatus.

FIG. 2A illustrates a perspective view 200 of an example countertop-mounted wireless power transmission apparatus. In some implementations, the wireless power transmission apparatus may be coupled with or integrated with a countertop 202. For example, a primary coil 204 of the wireless power transmission apparatus may be flush-mounted into the countertop 202. For brevity, only the primary coil 204 of the wireless power transmission apparatus is illustrated in FIG. 2A. However, other components of the wireless power transmission apparatus, such as those describe with reference to FIG. 1, may be integrated or mounted into the countertop 202.

Figure 2B:
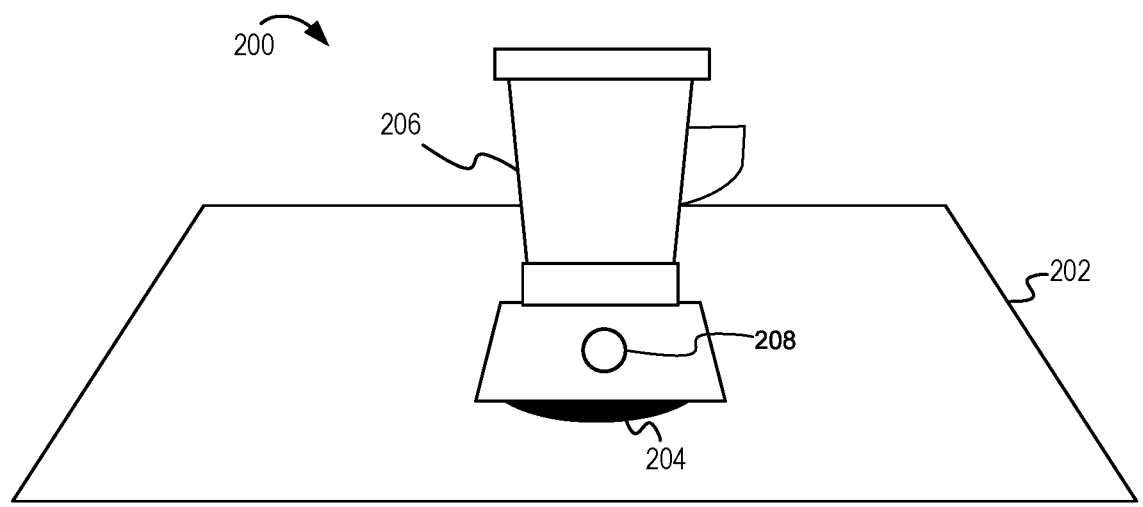
FIG. 2B illustrates a perspective view of an example countertop-mounted wireless transmission apparatus and an example cordless appliance.

FIG. 2B illustrates a perspective view 200 of an example countertop-mounted wireless transmission apparatus and an example cordless appliance. The cordless appliance (shown as a blender 206) may be placed on the primary coil 204. The cordless appliance may include a user-selectable load setting 208. The cordless appliance may include a wireless power reception apparatus (not shown in FIG. 2B). The wireless power transmission apparatus and the wireless power reception apparatus may include any of the components and functionalities described herein.

Figure 3:
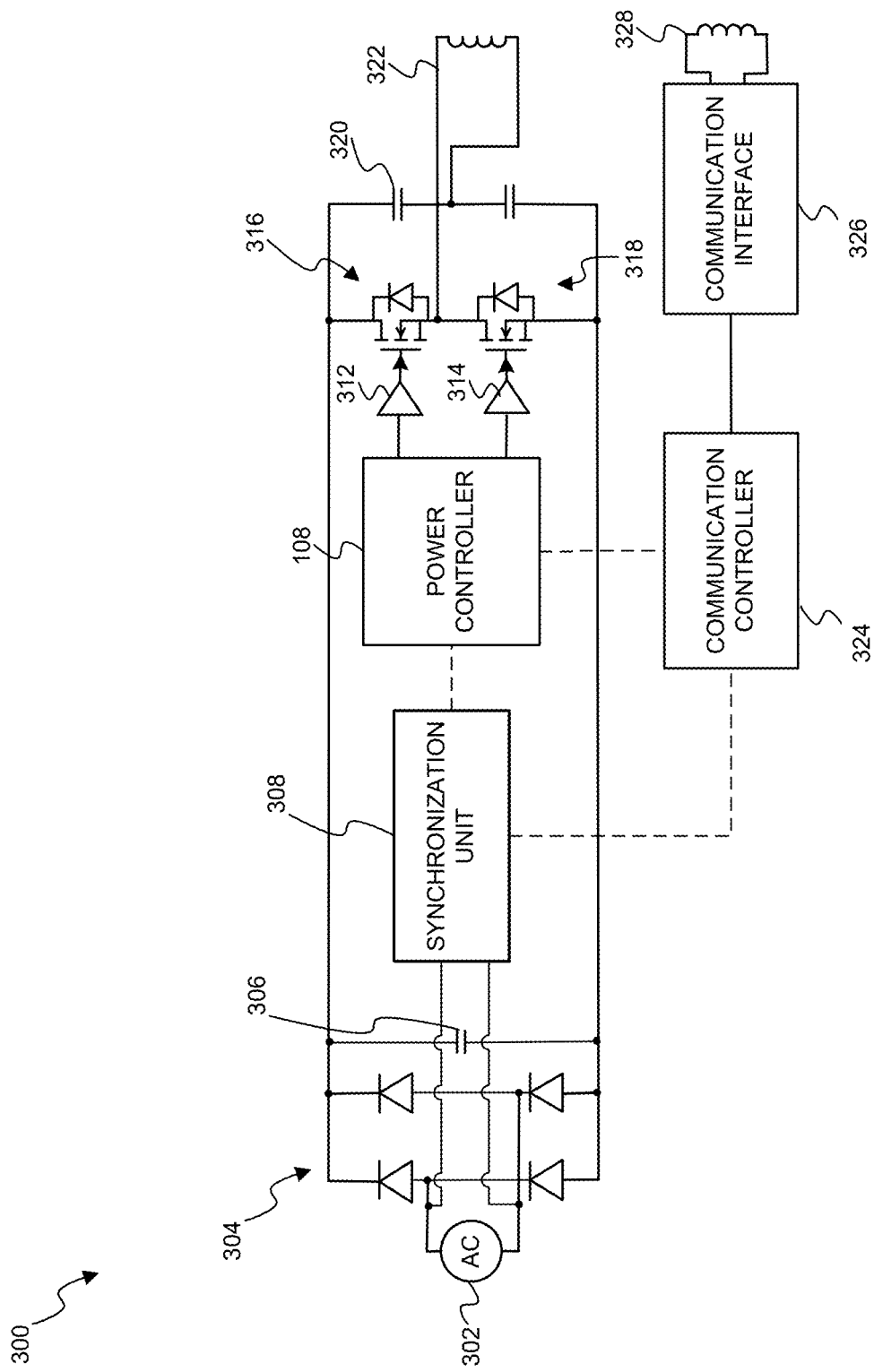
FIG. 3 shows a block diagram conceptually illustrating an example wireless power transmission apparatus.

FIG. 3 shows a block diagram conceptually illustrating an example wireless power transmission apparatus. In FIG. 3, the wireless power transmission apparatus 300 may include a power source 302, which is shown as an AC power source. However, the power source 302 may be a DC power source or any other suitable source power. The power source 302 may be connected to a rectifier 304 which may be connected to a capacitor 306. The power source 302 also may be connected to a synchronization unit 308. The synchronization unit 308 may generate a synchronization signal based on AC power from the power source 302. The synchronization unit 308 may provide the synchronization signal to a power controller 108 and the communication controller 324.

The rectifier 304 may provide DC power to a first switch 316 and a second switch 318. The first switch 316 and the second switch 318 may be metal-oxide-semiconductor field-effect transistors (MOSFETs) or Insulated Gate bipolar Transistors (IGBTs), among other examples. A first pulse width modulator (PWM) driver 312 may be connected to the first switch 316, and a second PWM driver 314 may be connected to the second switch 318. The power controller 108 may be connected to the first PWM driver 312 and the second PWM driver 314.

The power controller 108 may exchange communications with a wireless power reception apparatus via the communication controller 324 which may be connected to a communication interface 326. The communication interface 326 may include a communication coil 328. In some implementation, the communication interface 326 and the communication coil 328 are configured to communicate using an NFC communication protocol.

The wireless power transmission apparatus 300 may provide wireless power to a wireless power reception apparatus. The power controller 108 may detect the wireless power reception apparatus in proximity to the primary coil 322 and conduct a handshaking process during which the power controller 108 receives information from the wireless power reception apparatus. The power controller 108 may receive the information via the communication interface 326 and communication controller 324. The information may include one or more reference control parameters such as operating frequencies of the wireless power reception apparatus at different reference coupling factors, load voltages and load powers of the wireless power reception apparatus. The information also may indicate a load type and a load setting for a variable load associated with the wireless power reception apparatus. The power controller 108 may utilize this information to provide wireless power having characteristics that enable the wireless power reception apparatus to operate, from the onset, with relative efficiency. For example, the power controller 108 may select a reference control parameter, such as frequency for the wireless power, based on the load type and load setting information received from the wireless power reception apparatus. The power controller 108 may determine an operating control parameter and provide wireless power by controlling the first and second PWM drivers (312 and 314, respectively) based on the operating control parameter. The PWM drivers (312 and 314, respectively) may operate the first switch 316 and the second switch 318. The first switch 316 and second switch 318 may energize the primary coil 322 in a manner that transmits wireless power according to the operating control parameter to a secondary coil of the wireless power reception apparatus.

After providing power, the wireless power transmission apparatus 300 may modify the wireless power based on one or more changing conditions, such as a change to a load setting associated with a load connected to the wireless power reception apparatus. In response to the changing conditions, the power controller 108 and the wireless power reception apparatus may modify their respective configurations to accommodate the change in conditions. For example, the power controller 108 may determine one or more new operating control parameters (such as frequency of the wireless power) to accommodate the load setting change. The power controller 108 and the wireless power reception apparatus may implement their respective configuration changes in response to a synchronization event. In some implementations, the power controller 108 commences provision of the modified wireless power substantially contemporaneously with the wireless power reception apparatus commencing consumption of the modified wireless power.

Figure 4:
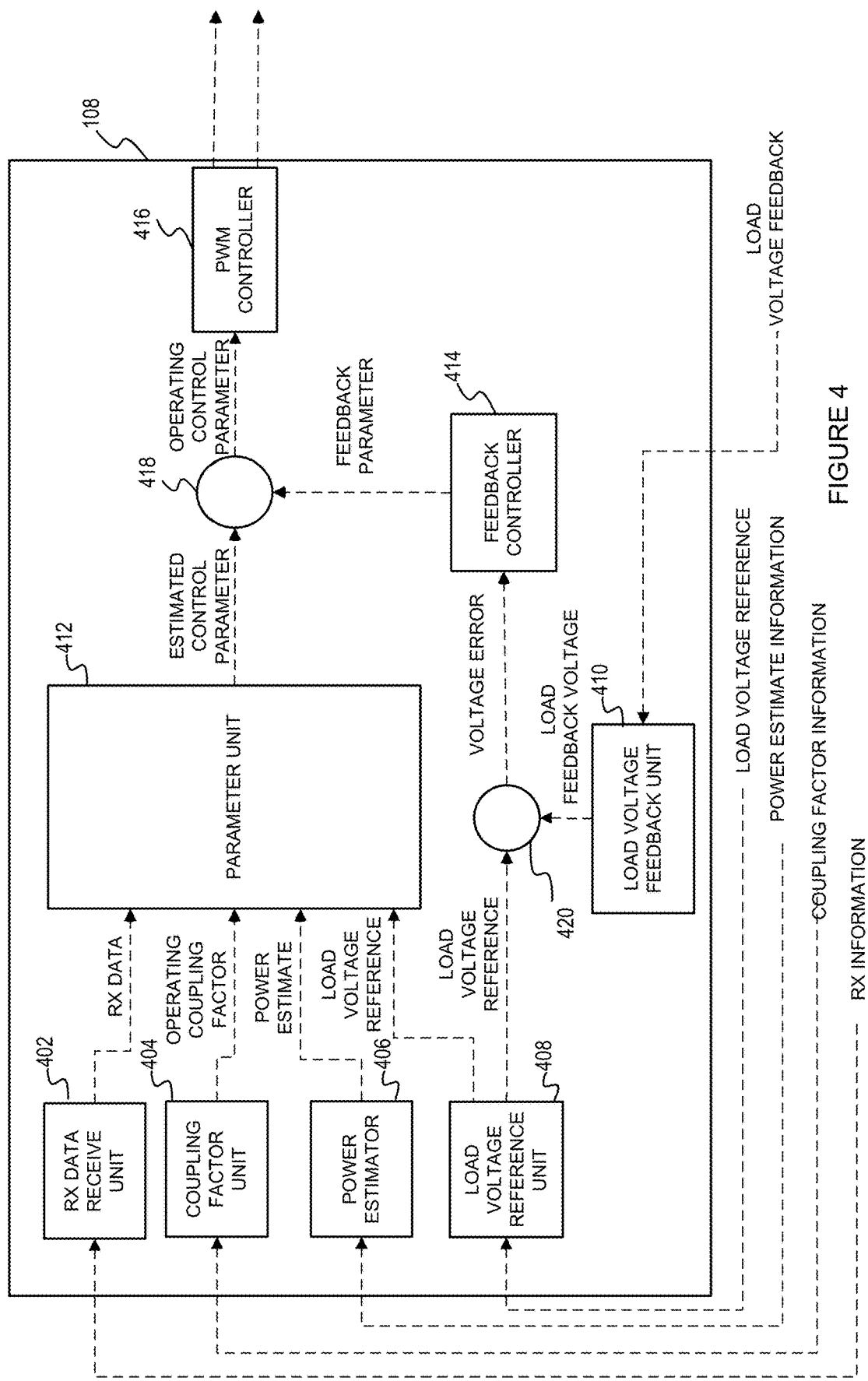
FIG. 4 shows a block diagram conceptually illustrating components of an example power controller.

FIG. 4 shows a block diagram conceptually illustrating components of an example power controller. The power controller 108 may reside in a wireless power transmission apparatus, such as any of the wireless power transmission apparatus 102 and 300 described with reference to FIGS. 1 and 3, respectively. In FIG. 4, the power controller 108 may include a parameter determination unit 412. The parameter determination unit 412 that may receive information from an RX data receive unit 402, a coupling factor unit 404, a power estimator 406 and a load voltage reference unit 408. The RX data receive unit 402 may include a memory or other storage that stores information (such as reference control parameters) received from the wireless power reception apparatus. In some implementations, the wireless power transmission apparatus may operate from an input voltage (such as an AC mains voltage) of nominal value, where the nominal value does not change substantially. In some implementations, the parameter determination unit 412 also may receive information about the input voltage (such as AC mains voltage) and the parameters, a coil inductance of the reference wireless power transmission apparatus, or any combination thereof. For example, the parameter determination unit 412 may adjust or scale calculations of control parameters based on input voltage changes and changes in parameters regarding the reference wireless power transmission apparatus such as the coil inductance of the reference wireless power transmission apparatus.

As described herein, a wireless power transmission apparatus may provide power having characteristics (such as a selected frequency) that enables a wireless power reception apparatus to operate with relative efficiency. During or after a handshaking process, the power controller 108 may receive information from the wireless power reception apparatus. The information may include one or more reference control parameters such as operating frequencies of the wireless power reception apparatus at different reference coupling factors, load voltages and load powers of the wireless power reception apparatus. In FIG. 4, the power controller 108 may receive the information (shown as RX data) in the RX data receive unit 402. The power controller 108 also may receive, in the coupling factor unit 404, coupling factor information indicating received voltages at a secondary coil. The power controller 108 also may receive, in the power estimator 406, a power estimate indicating an estimated power needed by a load (also referred to as estimated load power) and a load setting associated with the load. The power controller 108 also may receive, in the load voltage reference unit 408, a load voltage reference indicating a voltage needed by the load.

As part of a process for providing power to the wireless power reception apparatus, the RX data receive unit 402 may provide the RX data to the parameter determination unit 412. Prior to providing power, the coupling factor unit 404 may determine an operating coupling factor based on coupling factor information fed back from the wireless power reception apparatus and provide the operating coupling factor to the parameter determination unit 412. For example, the coupling factor unit 404 may determine an operating coupling factor between the wireless power transmission apparatus and the wireless power reception apparatus (such as under a zero-current condition in the secondary coil) based on a ratio of the received voltage value in the coupling factor information and a transmitted voltage value measured at the wireless power transmission apparatus. The received voltage value and the transmitted voltage value may be measured by the wireless power reception apparatus and the wireless power transmission apparatus, respectively, at a consistent time such as a measurement slot in relation to a synchronization event. The coupling factor unit 404 may transmit the operating coupling factor to the parameter determination unit 412. The power estimator 406 also may provide an estimate of power needed by the load and the load setting to the parameter determination unit 412. The load voltage reference unit 408 also may provide the load voltage reference to the parameter determination unit 412.

The parameter determination unit 412 may determine an estimated control parameter based on the RX data, operating coupling factor, power estimate and load voltage reference.

In some implementations, the RX data may include reference control parameters (such as operating frequency) when operating with a reference wireless power transmission apparatus at one or more reference coupling factors, one or more load powers and one or more load voltages. In some implementations, the parameter determination unit 412 may utilize the operating coupling factor, power estimate and load voltage reference to interpolate and extrapolate the RX data to determine the estimated control parameter. The parameter determination unit 412 may provide the estimated control parameter to a logic unit 418. If the logic unit 418 does not receive a feedback parameter from the feedback controller 414, the estimated control parameter becomes the operating control parameter. Using the operating control parameter, power transfer may be initiated or changed at a synchronization event. In some instances (such as in response to a changed load setting), the power controller 108 may determine a new estimated control parameter and modify the new estimated control parameter based on information communicated from the wireless power reception apparatus. In some implementations, the power controller 108 may coordinate with the wireless power reception apparatus to synchronize a change to the estimated control parameter (such as an increase in power) to cause synchronized transmission and consumption of the wireless power. The discussion of FIG. 5 describes more details about such synchronization.

After providing power to the wireless power reception apparatus, the power controller 108 may utilize information fed back from the wireless power reception apparatus. The power controller 108 may utilize such information to account for errors in the power estimate, errors in operating coupling factor and differences in parameters between the operating wireless power transmission apparatus and reference wireless power transmission apparatus. When responding to a changed load setting, the power controller 108 may determine a new estimated control parameter as described. The power controller 108 also may determine a feedback parameter based on information fed back from the wireless power reception apparatus. To determine the feedback parameter, the load voltage reference unit 408 may provide the load voltage reference to a comparator 420. A voltage feedback unit 410 also may provide a load feedback voltage to the comparator 420. The reference voltage may indicate a voltage needed by the load, whereas the load feedback voltage may indicate a measured voltage that is available to the load. The comparator 420 may determine a load voltage error based on the load voltage reference and the load feedback voltage. The load voltage error may be a difference between the load reference voltage and the load feedback voltage. The comparator 420 may provide the voltage error to the feedback controller 414. The feedback controller 414 may determine a feedback parameter based on the voltage error. The feedback parameter may be a value used to adjust the estimated control parameter (which is provided by the parameter determination unit 412) based on information fed back from the wireless power reception apparatus. The feedback parameter may relate to frequency, duty cycle, voltage, or any other suitable characteristic of the wireless power. The feedback controller 414 may provide the feedback parameter to the logic unit 418. In some implementations, the estimated control parameter has greater influence on the operating control parameter than does the feedback parameter.

The logic unit 418 can include one or more comparators, adders, subtractors, lookup tables and any other suitable logic for determining the operating control parameter. The logic unit 418 may receive the operating control parameter and the feedback parameter. The logic unit 418 may determine the operating control parameter based on the estimated control parameter and the feedback parameter. The operating control parameter may indicate one or more of a frequency, duty cycle, voltage, power amount or other suitable characteristic of wireless power to be provided to the wireless power reception apparatus. The logic unit 418 may provide the operating control parameter to the PWM controller 416. Based on the operating control parameter, the PWM controller 416 may control switch drivers (not shown in FIG. 4) to provide wireless power having one or more characteristics (such as a selected frequency) that enables the wireless power reception apparatus to operate with relative efficiency. In some implementations, the power controller 108 may coordinate with the wireless power reception apparatus to synchronize transmission and consumption of the wireless power. The discussion of FIG. 5 describes more details about such synchronization.

Figure 5:
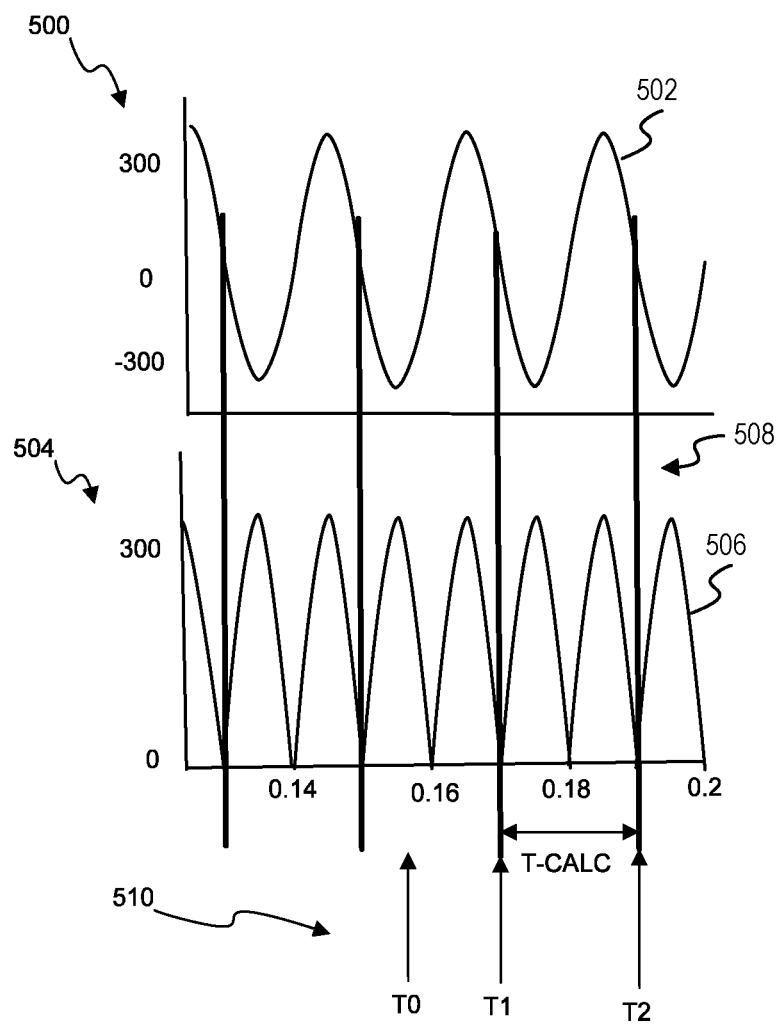
FIG. 5 illustrates example voltage curves with which a power controller of a wireless power transmission apparatus may synchronize with a load controller of a wireless power reception apparatus.

FIG. 5 illustrates example voltage curves with which a power controller of a wireless power transmission apparatus may synchronize with a load controller of a wireless power reception apparatus. In FIG. 5, an AC voltage graph 500 shows an AC voltage curve 502. The AC voltage curve 502 may represent an AC voltage from the main terminals feeding the wireless power transmission apparatus (referred to herein as "AC mains"). For illustration, the AC mains frequency may be 50 Hz. In FIG. 5, a DC voltage graph 504 shows a DC voltage curve 506. The DC voltage curve 506 may represent a rectified voltage available after the rectifier in the wireless power transmission apparatus. The DC voltage curve 506 also may represent an output of a smaller rectifier feeding off the AC mains and connecting to a voltage sensor and/or bias power unit that provides power to the electronics in the wireless power transmission apparatus. The lines 508 indicate points at which the AC voltage curve 502 and the DC voltage curve 506 simultaneously have a voltage of 0 V (also referred to as a zero voltage).

The wireless power transmission apparatus may include a synchronization unit that may provide a signal representing the AC voltage curve 502 or the rectified DC voltage curve 506 to the power controller 108. Near every point at which the AC mains voltage is zero (also referred to as a zero crossing), the power controller 108 may stop power transfer for a short time (such as approximately 300 micro seconds, approximately one millisecond, or any other suitable time period) by disabling a PWM driver to enable data communication between the wireless power transmission apparatus and the wireless power reception apparatus using NFC or to perform foreign object detection (FOD) operations. FIG. 5 shows the time at which data communication instances occur via the lines 508, which indicate every other zero crossing of the AC mains voltage. In some implementations, for each zero crossing that is not marked with one of the lines 508, the wireless power transmission apparatus may perform FOD operations. In some implementations, an absence of power transfer to the wireless power transmission apparatus during these instances may serve as a clock to the wireless power reception apparatus to synchronize its operation with the wireless power transmission apparatus. Hence, the wireless power transmission apparatus can synchronously cooperate with the wireless power reception apparatus. More specifically, the power controller 108 and the load controller 136 may cooperate to synchronize their respective power operations. For example, when providing power to the wireless power reception apparatus, the power controller 108 may wait for a synchronization event before commencing transmission of the power. The synchronization event may be the next point at which the AC voltage curve 502 has zero voltage. In response to the synchronization event (such as the next instance of zero voltage), the power controller 108 may commence transmission of wireless power based on an operating control parameter (as described with reference to FIG. 4). Similarly, the load controller 136 also may wait for the synchronization event before configuring a change in load to consume the changed power. In some instances, the power controller 108 may substantially simultaneously commence wireless power transmission when the load controller 136 configures the load to commence consumption of the wireless power.

FIG. 5 includes temporal markers 510 indicating events in a wireless power system. More specifically, the temporal markers 510 indicate events arising when a load setting changes. At time=T0, a load controller 136 may detect a change to a load setting. For example, the load setting change could be initiated by a user changing a knob or other setting in an appliance. In some implementations, communications may occur synchronously upon every second zero voltage. At time=T1, when the power transfer is disabled by the power controller 108, the load controller 136 may communicate the changed load setting to the power controller 108. Instead of immediately configuring the load to accommodate the load setting, the load controller 136 may wait for a synchronization event before configuring the load.

Also at time=T1 (or substantially when time=T1), the power controller 108 may receive the load setting from the load controller 136.

In the duration between time=T1 and time=T2, the power controller 108 may determine a new operating control parameter (for example, as described with respect to FIG. 4). Instead of immediately commencing transmission of wireless power based on the new operating control parameter, the power controller 108 may wait for a synchronization event.

At T2, there is a zero voltage for the AC voltage curve 502 and for the DC voltage curve 506, during which power transfer is disabled by the power controller 108. The synchronization event is detected at both the wireless power transmission apparatus (such as by the power controller 108) and the wireless power reception apparatus (such as by the receiver controller 128 or the load controller 136). In response to the synchronization event, the power controller 108 begins providing wireless power according to the new operating control parameter, and the load controller 136 configures the load to the changed load setting. When the switching is resumed by the power controller 108, power transfer to the changed load setting may resume according to the new operating control parameter (such as frequency duty cycle, voltage, etc.).

Figure 6:
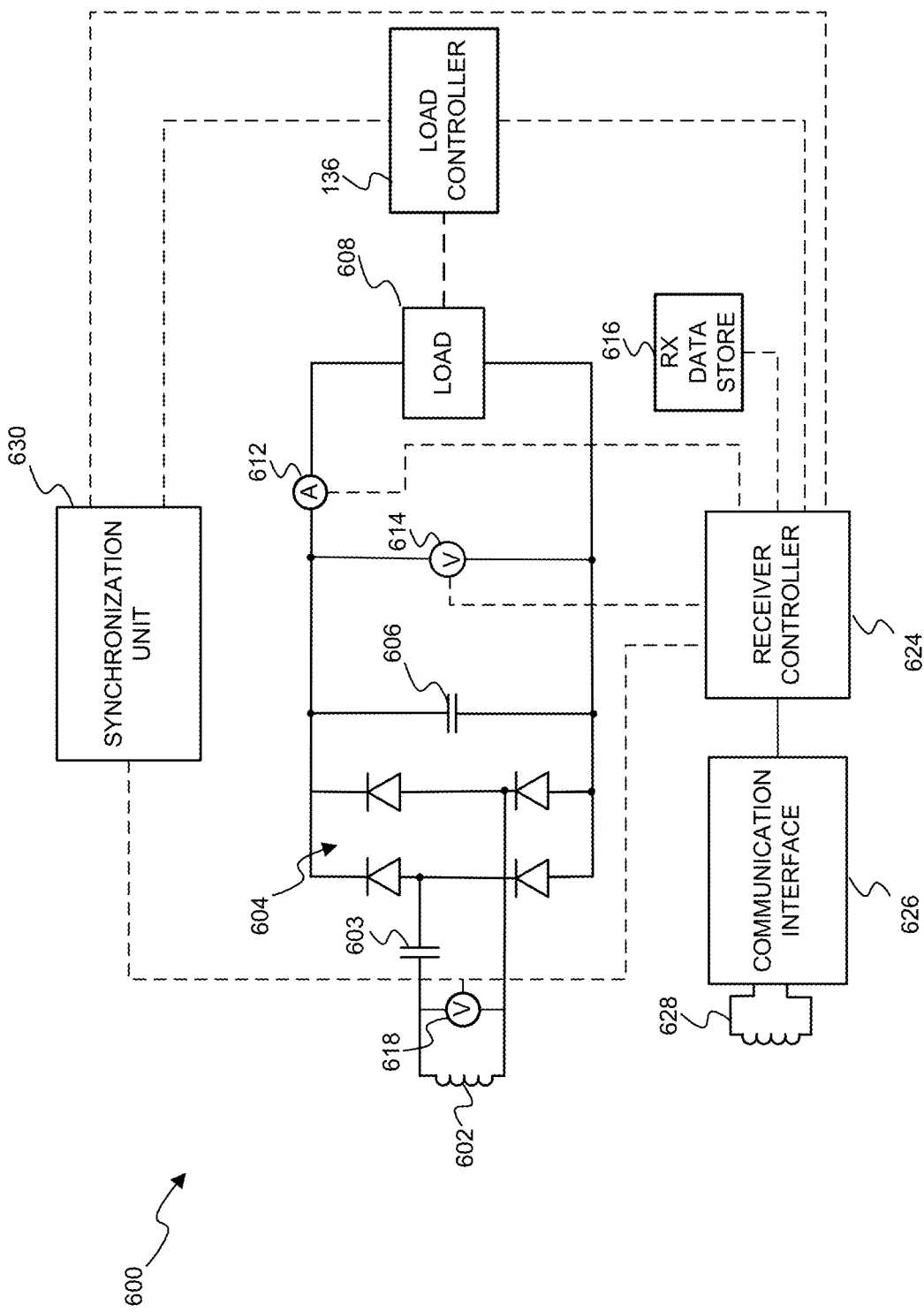
FIG. 6 shows a block diagram conceptually illustrating an example wireless power reception device.

FIG. 6 shows a block diagram conceptually illustrating an example wireless power reception device according. In FIG. 6, a wireless power reception apparatus 600 includes a secondary coil 602. The secondary coil 602 may be connected to a series capacitor 603 and a rectifier 604, which may be connected to a load 608. The wireless power reception apparatus 600 also may include a communication interface 626, which may include a second communication coil 628. The communication interface 606 may be connected to a receiver controller 624.

The receiver controller 624 also may receive various information and transmit that information to a wireless power transmission apparatus via the communication interface 626. The receiver controller 624 may receive wireless power reception apparatus data from a wireless power reception apparatus data store 616 (shown as RX data store 616). The wireless power reception apparatus data may include, among other things, reference control parameters such as operating frequencies of the wireless power reception apparatus at different reference coupling factors, load voltages and load powers of the wireless power reception apparatus obtained when the wireless power reception apparatus was tested on a reference wireless power transmission apparatus. The receiver controller 624 also may receive information indicating load settings and power estimates from the load controller 136. The receiver controller 624 also may receive first voltage information from a first voltage sensor 618 that is connected to the secondary coil 602. The first voltage information may indicate a peak or root mean square (RMS) voltage at the secondary coil 602. The receiver controller 624 also may receive second voltage information from a second voltage sensor 614 that is connected to the rectifier 604. The second voltage information may indicate a voltage available to the load 608. The receiver controller 624 also may receive information about current from a current sensor 612 connected to the rectifier 604. The information about current and voltage may indicate an amount of power available for the load 608.

The receiver controller 624 may transmit, to the wireless power receiver, the aforementioned wireless power reception apparatus data, first voltage information, second voltage information, information about current, the information indicating load settings and power estimates related to the load. In some instances, the receiver controller 624 may transmit some or all of the wireless power reception apparatus data to the power controller during a handshaking process, as described herein. In some instances, the receiver controller 624 may transmit, to the power controller 108, one or more of the load setting, the power estimate for the load, the first voltage information, the second voltage information and the information about current as part of a feedback mechanism by which the power controller 108 can modify the wireless power being transmitted to the wireless power reception apparatus 600.

A synchronization unit 630 may be associated with the first voltage sensor 618. The synchronization unit 630 may determine a synchronization event and may provide a synchronization signal by which components can synchronize operations. For example, the synchronization unit 630 may determine a synchronization event based on a time when the coil sensed voltage (at the first voltage sensor 618) is zero indicating no switching in the wireless power transmission apparatus. The synchronization event detected by the synchronization unit 630 may be at substantially the same time as a corresponding synchronization event determined by a synchronization unit (not shown) of the wireless power transmission apparatus.

As described herein, the load controller 136 may synchronize operations with the power controller 108. For example, the load controller 136 may wait for a synchronization event (such as a zero voltage) before configuring the load 608 according to a changed load setting. For motor type loads, this may involve switching on/off relays/switches (not shown in FIG.) in the load 608. The load controller 136 may synchronize with the power controller 108 prior to power transfer, when receiving power or during operation after a load setting has been changed.

FIG. 7 illustrates example voltage graphs 700 associated with a wireless power system implementing a traditional feedback control technique. A first graph includes a reference load voltage curve 702 representing a desired load voltage in a wireless power reception apparatus. A second graph includes an actual load voltage curve 704 representing an average value of a load voltage sensed at the load of the wireless power reception apparatus. These graphs represent voltages in a traditional wireless kitchen system (such as a heating appliance) that does not have the benefit of this disclosure. The traditional wireless kitchen system may use a traditional feedback control technique in which changes in wireless power transmission is controlled by a feedback message from the wireless power reception apparatus to the wireless power transmission apparatus after a change in a load setting of the wireless power reception apparatus. The actual load voltage curve 704 shows a delayed response in the power provided to the load. At a first point in time (shown as T0), power is flowing in the wireless power reception apparatus at a first load voltage (V1). At a second point in time (shown as T1), the power setting of the appliance is increased. Based on the new power setting, the reference load voltage curve 702 changes from V1 to a second load voltage (V2). The traditional feedback control technique may include a feedback message to indicate that the reference load voltage has changed to V2. However, the load may begin drawing power for the second load voltage immediately even though the wireless power transmission apparatus has not yet determined a new operating control parameter based on the new reference load voltage. Thus, after an increase in reference load voltage 702 from V1 to V2 at T1, the actual load voltage curve 704 may take significant time to reach the new steady state value of V2. As shown in the graphs 700, the actual load voltage curve 704 shows a sloped curve with delayed response after T1. At the third point in time (shown as T2), the power setting is decreased to indicate a decrease in reference load voltage setting from V2 to V1. Similar to the delayed response to the increase in reference load voltage, after the reduction in reference load voltage from V2 to V1 at T2, the average load voltage (represented by the actual load voltage curve 704) may take significant time to reach the new steady state value.

FIG. 8 illustrates example graphs 800 associated with a wireless power reception system that implements power control according to some implementations of this disclosure. A first graph includes a reference load voltage curve 802 representing a desired load voltage in the wireless power reception apparatus. Changes in load voltage at T1 and T2 and the corresponding reference load voltage curve 802 in FIG. 8 is the same as the reference load voltage curve 802 described with reference to FIG. 7. A second graph includes an actual load voltage curve 804 representing an average value of the load voltage sensed at the load of the wireless power reception apparatus. In contrast to FIG. 7, the average value of the load voltage represented by the actual load voltage curve 804 in FIG. 8 shows how the load voltage may be influenced by operations of a load controller 136 and a power controller 108 described herein. When the power is increased (at T1) by a change in reference load voltage from V1 to V2, the average value of the load voltage (represented by the actual load voltage curve 804) shows settling to the load setting value of V2 in a relatively short time. Similarly, at T2, where the load setting is reduced by a reduction in reference voltage from V2 to V1, the average load voltage settles to V1 in a relatively short time. The power controller 108 may determine a new operating control parameter based on a change in load setting voltage, resulting in faster transient behavior. As shown, the functionality and components described herein may increase responsiveness to power changes and may enhance user experience.

Figure 9:
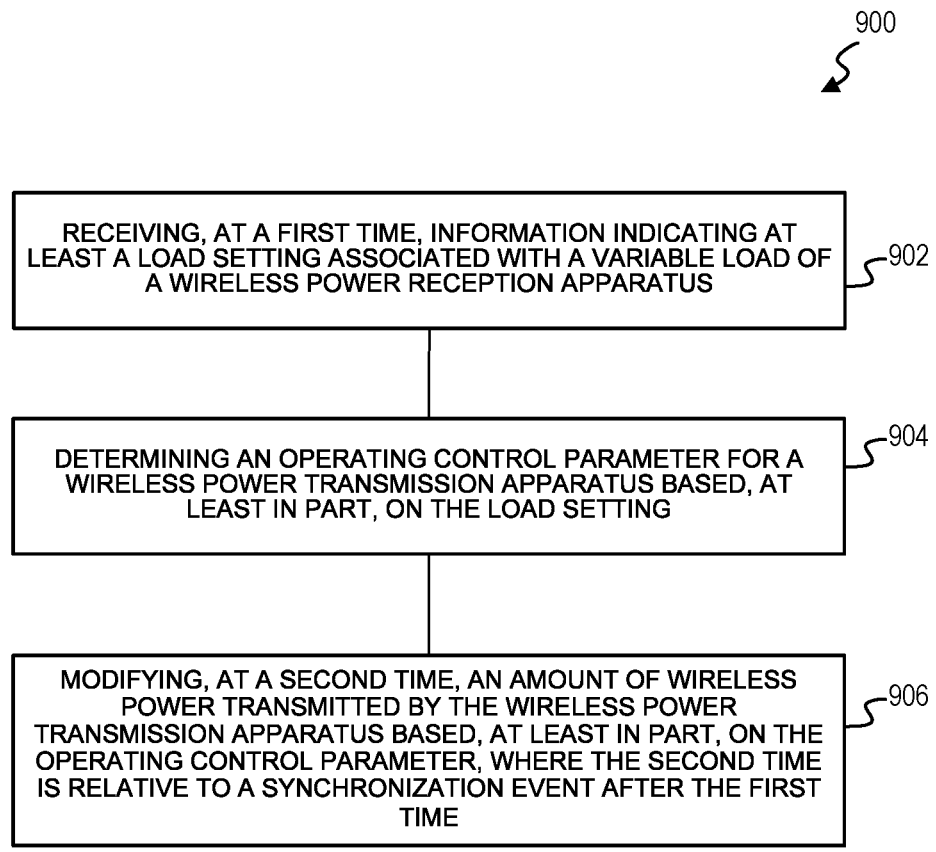
FIG. 9 shows a flow diagram illustrating example operations of a process for providing wireless power to a wireless power reception apparatus.

FIG. 9 shows a flow diagram illustrating example operations of a process for providing wireless power to a wireless power reception apparatus. For brevity, the operations are described as performed by an apparatus. The operations of the process 900 may be implemented by a wireless power transmission apparatus as described herein. For example, the process 900 may be performed by the wireless power transmission apparatus 102 and the power controller 108 described with reference to FIG. 1, the wireless power transmission apparatus 300 and power controller 108 described with reference to FIG. 3, the power controller 108 described with reference to FIG. 4 or the apparatus 1200 described with reference to FIG. 12.

At block 902, the apparatus receives, at a first time, information indicating at least a load setting associated with a variable load of a wireless power reception apparatus.

At block 904, the apparatus determines an operating control parameter for the apparatus based, at least in part, on the load setting.

At block 906, the apparatus modifies, at a second time, an amount of wireless power transmitted by the apparatus based, at least in part, on the operating control parameter, where the second time is relative to a synchronization event after the first time.

Figure 10:
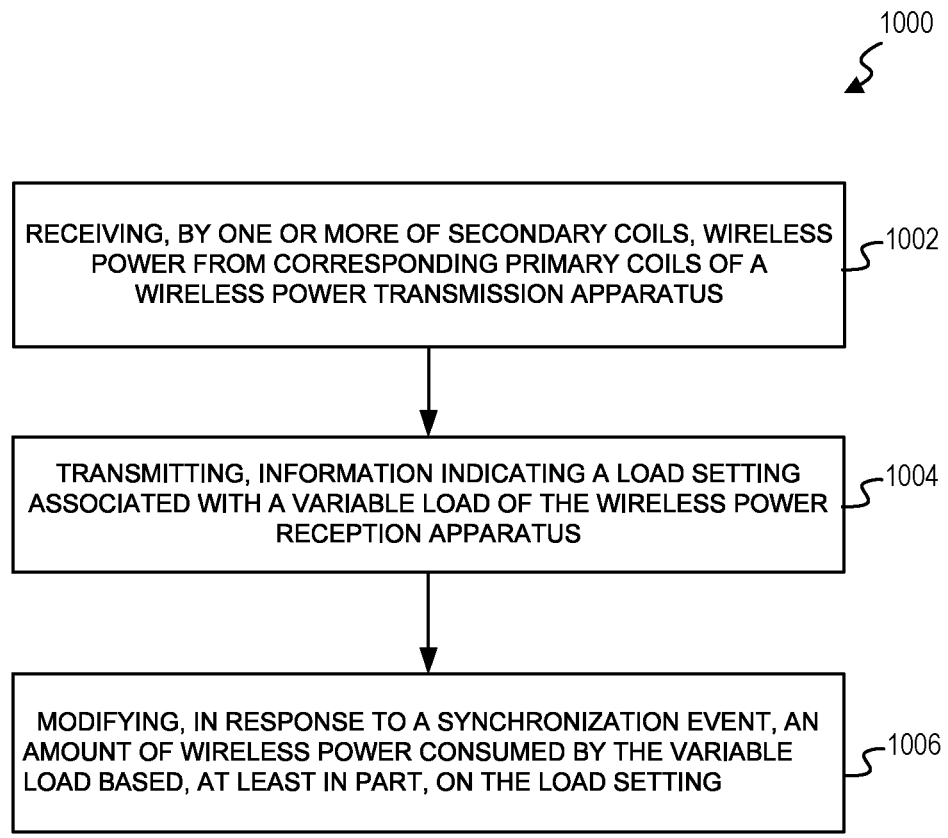
FIG. 10 shows a flow diagram illustrating example operations of a process for receiving wireless power in a wireless power reception apparatus.

FIG. 10 shows a flow diagram illustrating example operations of a process for receiving wireless power in a wireless power reception apparatus. For brevity, the operations are described as performed by an apparatus. The operations of the process 900 may be implemented by a wireless power reception apparatus as described herein. For example, the process 1000 may be performed by a wireless power reception apparatus 118 and the load controller 136 described with reference to FIG. 1 and the wireless power reception apparatus 600 described with reference to FIG. 6.

At block 1002, the apparatus receives, by one or more secondary coils wireless power from a corresponding one or more primary coils of a wireless power transmission apparatus.

At block 1004, the apparatus transmits information indicating a load setting associated with a variable load of the apparatus.

At block 1006, the apparatus modifies, in response to a synchronization event, an amount of wireless power consumed by the variable load based, at least in part, on the load setting.

Figure 11:
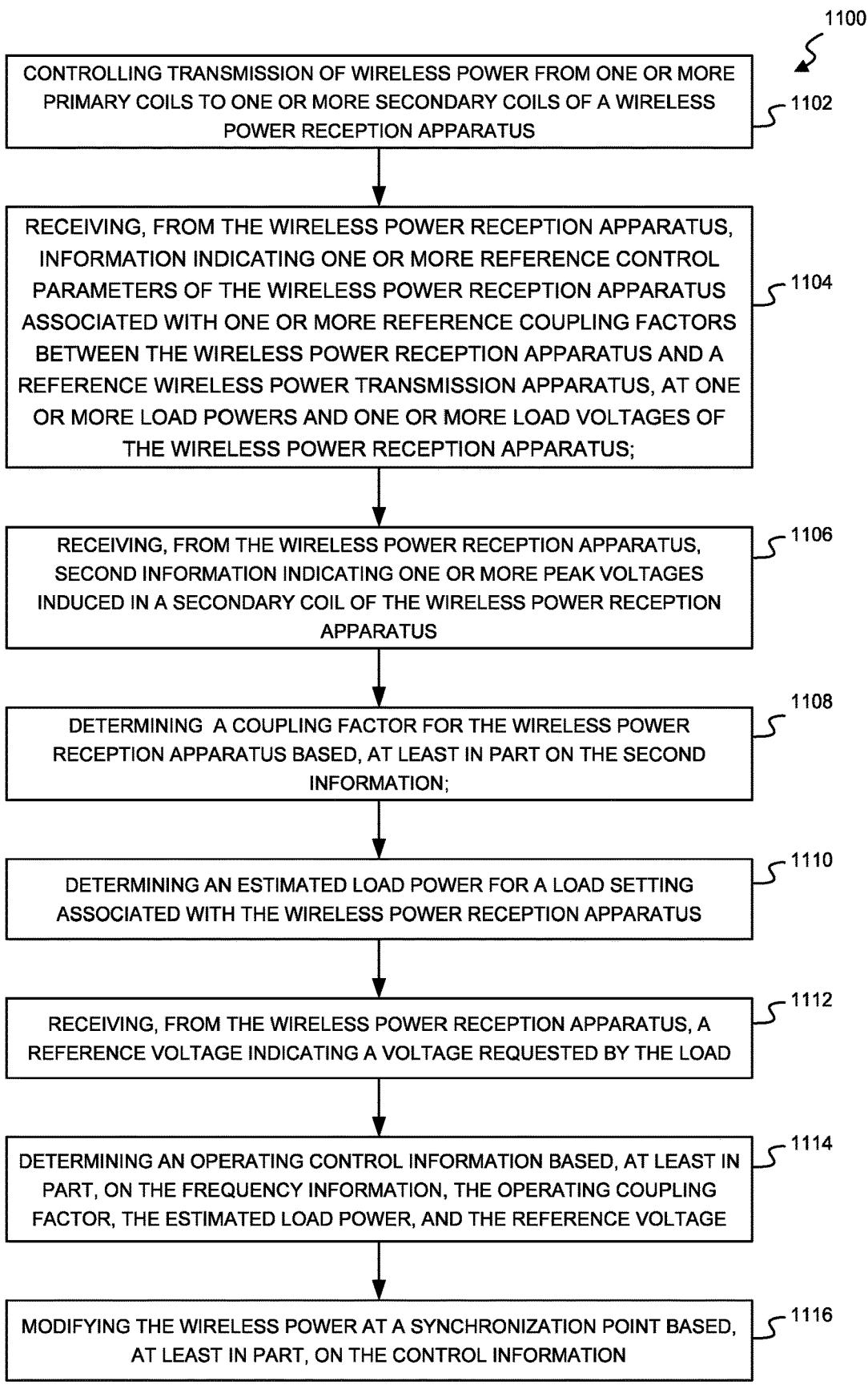
FIG. 11 shows a flow diagram illustrating example operations of a process for transmitting wireless power to a wireless power reception apparatus.

FIG. 11 shows a flow diagram illustrating example operations of a process for transmitting wireless power to a wireless power reception apparatus. For brevity, the operations are described as performed by an apparatus. The operations of the process 1100 may be implemented by a wireless power transmission apparatus as described herein. For example, the process 1100 may be performed by the wireless power transmission apparatus 102 and the power controller 108 described with reference to FIG. 1, the wireless power transmission apparatus 300 and power controller 108 described with reference to FIG. 3, the wireless power transmission apparatus 400 and the power controller 108 described with reference to FIG. 4 or the apparatus 1200 described with reference to FIG. 12.

At block 1102, the apparatus controls transmission of wireless power from one or more primary coils to one or more secondary coils of a wireless power reception apparatus.

At block 1104, the apparatus receives, from the wireless power reception apparatus, information indicating one or more reference control parameters of the wireless power reception apparatus associated with one or more reference coupling factors between the wireless power reception apparatus and a reference wireless power transmission apparatus, at one or more load powers and one or more load voltages of the wireless power reception apparatus.

At block 1106, the apparatus receives, from the wireless power reception apparatus, second information indicating one or more peak voltages induced in a secondary coil of the wireless power reception apparatus.

At block 1108, the apparatus determines an operating coupling factor for the wireless power reception apparatus based, at least in part, on the second information.

At block 1110, the apparatus determines an estimated load power for a load setting associated with the wireless power reception apparatus.

At block 1112, the apparatus receives, from the wireless power reception apparatus, a reference voltage indicating a voltage requested by the load.

At block 1114, the apparatus determines, by the power controller, an operating control parameter based, at least in part, on the information received from the wireless power reception apparatus, the operating coupling factor, the estimated load power, and the reference voltage.

At block 1116, the apparatus modifies the wireless power at a synchronization point based, at least in part, on the control information.

Figure 12:
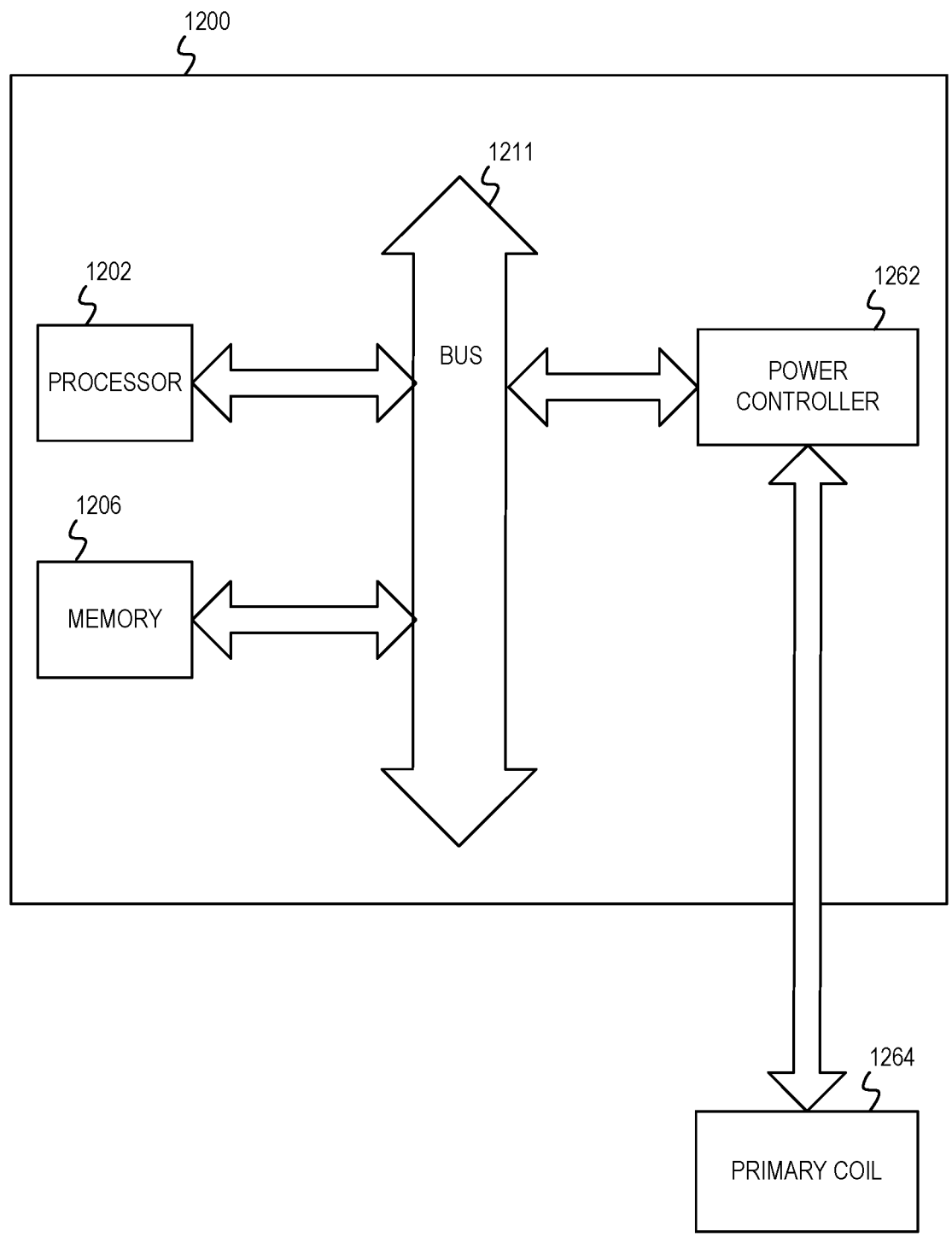
FIG. 12 shows a block diagram of an example apparatus for use in wireless power system.

FIG. 12 shows a block diagram of an example apparatus for use in wireless power system. In some implementations, the apparatus 1200 may be a wireless power transmission apparatus (such as the wireless power transmission apparatus 102) described herein. In some implementations, the apparatus 1200 may be an example of the power controller 108 described with reference to FIG. 1, the wireless power transmission apparatus 300 described with reference to FIG. 3. The apparatus 1200 can include a processor 1202 (possibly including multiple processors, multiple cores, multiple nodes, or implementing multi-threading, etc.). The apparatus 1200 also can include a memory 1206. The memory 1206 may be system memory or any one or more of the possible realizations of computer-readable media described herein. The apparatus 1200 also can include a bus 1211 (such as PCI, ISA, PCI-Express, HyperTransport®, InfiniBand®, NuBus,® AHB, AXI, etc.).

The apparatus 1200 may include one or more controller(s) 1262 configured to manage multiple primary or secondary coils (such as a coil array 1264). In some implementations, the controller(s) 1262 can be distributed within the processor 1202, the memory 1206, and the bus 1211. The controller(s) 1262 may perform some or all of the operations described herein. For example, the controller(s) 1262 may be a power controller, such as the power controller 108 described with reference to FIG. 1 or the power controller 108 described with reference to FIG. 3.

The memory 1206 can include computer instructions executable by the processor 1202 to implement the functionality of the implementations described with reference to FIGS. 1-11. Any one of these functionalities may be partially (or entirely) implemented in hardware or on the processor 1202. For example, the functionality may be implemented with an application specific integrated circuit, in logic implemented in the processor 1202, in a co-processor on a peripheral device or card, etc. Further, realizations may include fewer or additional components not illustrated in FIG. 12. The processor 1202, the memory 1206, and the controller(s) 1262 may be coupled to the bus 1211. Although illustrated as being coupled to the bus 1211, the memory 1206 may be coupled to the processor 1202.

FIGS. 1-12 and the operations described herein are examples meant to aid in understanding example implementations and should not be used to limit the potential implementations or limit the scope of the claims. Some implementations may perform additional operations, fewer operations, operations in parallel or in a different order, and some operations differently.

The figures, operations, and components described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor-executable or computer-executable instructions encoded on one or more tangible processor-readable or computer-readable storage media for execution by, or to control the operation of, a data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless power transmission by a wireless power transmission apparatus, the method comprising:
receiving, from a wireless power reception apparatus, first information indicating one or more reference control parameters for one or more load settings of a variable load of the wireless power reception apparatus;
receiving, at a first time, a message indicating at least a load setting of the one or more load settings;
estimating an operating control parameter for the wireless power transmission apparatus based, at least in part, on the load setting and the one or more reference control parameters for the load setting; and
modifying, at a second time, an amount of wireless power transmitted by the wireless power transmission apparatus based, at least in part, on the operating control parameter.

2. The method of claim 1, wherein the message indicating at least the load setting is received by a communication coil of the wireless power transmission apparatus.

3. The method of claim 1, further comprising, before the first time:
transmitting wireless power from at least a first primary coil of the wireless power transmission apparatus to at least a first secondary coil of the wireless power reception apparatus based on a previous load setting associated with the variable load of the wireless power reception apparatus.

4. The method of claim 1, further comprising:
modifying the operating control parameter based, at least in part, on a difference between a reference voltage indicating a voltage required by the variable load of the wireless power reception apparatus and a load voltage indicating a voltage available to the variable load.

5. The method of claim 1, wherein the operating control parameter indicates an estimated frequency for the wireless power.

6. The method of claim 1, wherein the operating control parameter indicates a duty cycle at an operating frequency for the wireless power.

7. The method of claim 1, wherein the second time is relative to a synchronization event after the first time, and wherein the synchronization event occurs in relation to a time when an alternating current (AC) voltage feeding the wireless power transmission apparatus is equal to zero volts.

8. The method of claim 1, further comprising:
receiving, from the wireless power reception apparatus, a reference voltage indicating a voltage required by the load associated with the wireless power reception apparatus; and
estimating the operating control parameter based, at least in part, on the first information and the reference voltage.

9. The method of claim 8, wherein the first information was determined via experimental testing on a reference wireless power transmission apparatus.

10. The method of claim 8, further comprising:
applying a voltage to a primary coil of the wireless power transmission apparatus to induce a received voltage in a secondary coil of the wireless power reception apparatus, wherein a first magnitude of the received voltage is smaller than a second magnitude of a load voltage of the wireless power reception apparatus;
receiving, from the wireless power reception apparatus, a received voltage value indicating the received voltage induced in a first secondary coil of the wireless power reception apparatus;
determining a transmitted voltage value indicating a transmitted voltage amount supplied to a first primary coil of the wireless power transmission apparatus;
determining an operating coupling factor between the wireless power transmission apparatus and the wireless power reception apparatus based, at least in part, on a ratio of the received voltage value and the transmitted voltage value; and
estimating the operating control parameter further based, at least in part on, the operating coupling factor.

11. The method of claim 1, wherein the load setting indicates a power consumption by the variable load.

12. The method of claim 1, wherein the operating control parameter is further based on:
one or more reference coupling factors between the wireless power reception apparatus and a reference wireless power reception apparatus at one or more load powers and one or more load voltages of the wireless power reception apparatus,
an operating coupling factor of a secondary coil of the wireless power reception apparatus to a first primary coil of the wireless power transmission apparatus, a power estimate indicating an amount of power needed by the variable load, and a reference voltage indicating an amount of voltage needed by the variable load.

13. The method of claim 12, wherein determining the operating control parameter includes using the reference coupling factor, the power estimate and the reference voltage to interpolate and extrapolate the first information indicating the one or more reference control parameters associated with one or more operating coupling factors at the one or more load powers and the one or more load voltages of the wireless power reception apparatus.

14. The method of claim 1, wherein the first time is after a communication delay associated with the message indicating at least a load setting of the wireless power reception apparatus.

15. The method of claim 1, further comprising:
refraining from modifying the amount of wireless power transmitted by the wireless power until the second time, wherein the second time includes a synchronization event occurring after receiving a synchronization information, and wherein the synchronization event occurs in relation to a zero-cross instance of an alternating current (AC) voltage feeding the wireless power transmission.

16. A method for controlling a wireless power reception apparatus including at least one secondary coil, the method comprising:
receiving, by the secondary coil, wireless power from at least one corresponding primary coil of a wireless power transmission apparatus;
transmitting first information indicating one or more reference control parameters for one or more load settings of a variable load of the wireless power reception apparatus;
transmitting, at a first time, a message indicating a load setting associated with the variable load of the wireless power reception apparatus; and
modifying, at a second time after the first time, an amount of the wireless power consumed by the variable load based, at least in part, on the load setting.

17. The method of claim 16, further comprising:
transmitting, to the wireless power transmission apparatus, a reference voltage indicating a voltage required by a load associated with the wireless power reception apparatus; and
transmitting, to the wireless power transmission apparatus, a measured load voltage indicating a voltage available to the load.

18. The method of claim 16, wherein the second time is relative to a synchronization event after the first time, and wherein the synchronization event occurs in relation to a time when an alternating current (AC) voltage feeding the wireless power transmission apparatus is equal to zero volts.

19. The method of claim 16, further comprising:
transmitting, to the wireless power transmission apparatus, a received voltage value indicating a received voltage induced in at least one secondary coil of the wireless power reception apparatus.

20. The method of claim 19, wherein the received voltage induced in the secondary coil of the wireless power reception apparatus corresponds to a voltage applied to a primary coil in the wireless power transmission apparatus, wherein a first magnitude of the received voltage is smaller than a second magnitude of a load voltage of the wireless power reception apparatus.

21. A method for controlling a wireless power transmission apparatus, the method comprising:
controlling, by a power controller, transmission of wireless power from one or more primary coils of the wireless power transmission apparatus to one or more secondary coils of a wireless power reception apparatus;
receiving, from the wireless power reception apparatus, first information indicating one or more reference control parameters for one or more load settings of a variable load of the wireless power reception apparatus;
receiving, from the wireless power reception apparatus, second information indicating one or more peak voltages induced in a secondary coil of the wireless power reception apparatus;
determining, by the power controller, an operating coupling factor for the wireless power reception apparatus based, at least in part on the second information;
determining, by the power controller, an estimated load power for a load setting of the one or more load settings;
receiving, from the wireless power reception apparatus, a reference voltage indicating a voltage requested by the load;
determining, by the power controller, an operating control parameter based, at least in part, on the first information and the second information received from the wireless power reception apparatus, the operating coupling factor, the estimated load power, and the reference voltage; and
modifying, by the power controller, the wireless power based, at least in part, on the operating control parameter.

22. The method of claim 21, further comprising:
receiving, from the wireless power reception apparatus, a measured load voltage indicating a voltage available to the load;
determining a voltage error based on a difference between the reference voltage and the measured load voltage; and
modifying the operating control parameter based, at least in part, on the voltage error.

23. A wireless power transmission apparatus comprising:
a primary coil configured to transmit wireless power to at least one secondary coil of a wireless power reception apparatus; and
a power controller configured to:
receive first information indicating one or more reference control parameters for one or more load settings of a variable load of the wireless power reception apparatus,
receive, at a first time, a message indicating at least a load setting of the one or more load settings,
estimate an operating control parameter based, at least in part, on the load setting and the one or more reference control parameters for the load setting, and
modify, at a second time after the first time, an amount of the wireless power based, at least in part, on the operating control parameter.

24. The wireless power transmission apparatus of claim 23, wherein the message indicating the load setting is received by a communication coil of the wireless power transmission apparatus.

25. The wireless power transmission apparatus of claim 23, wherein the power controller is further configured to:

control, at a third time, transmission of the modified amount of the wireless power from the primary coil to the at least one secondary coil of the wireless power reception apparatus.

26. The wireless power transmission apparatus of claim 25, wherein the third time is before the first time.

27. The wireless power transmission apparatus of claim 23, wherein the power controller is further configured to:
modify the operating control parameter based, at least in part, on a difference between a reference voltage indicating a voltage required by the variable load of the wireless power reception apparatus and a load voltage indicating a voltage available to the variable load, wherein the modified operating control parameter becomes the operating control parameter.

28. A wireless power reception apparatus comprising:
a secondary coil configured to receive wireless power from at least one corresponding primary coil of a wireless power transmission apparatus; and
a load controller configured to:
transmit first information indicating one or more reference control parameters for one or more load settings of a variable load of the wireless power reception apparatus,
transmit, at a first time, a message indicating a load setting of the one or more load settings, and
modify, at a second time after the first time, an amount of the wireless power consumed by the variable load based, at least in part, on the load setting and the one or more reference control parameters.

29. The wireless power reception apparatus of claim 28, wherein the load controller is further configured to:
transmit, to the wireless power transmission apparatus, a reference voltage indicating a voltage required by a load associated with the wireless power reception apparatus, and
transmit, to the wireless power transmission apparatus, a measured load voltage indicating a voltage available to the load.

30. The wireless power reception apparatus of claim 28, wherein the second time is relative to a synchronization event after the first time, and wherein the synchronization event occurs in relation to a time when an alternating current (AC) voltage feeding the wireless power transmission apparatus is equal to zero volts.

31. The wireless power reception apparatus of claim 28, wherein the load controller is further configured to:
transmit, to the wireless power transmission apparatus, a received voltage value indicating a received voltage induced in at least one secondary coil of the wireless power reception apparatus.

32. The wireless power reception apparatus of claim 31, wherein the received voltage induced in the secondary coil of the wireless power reception apparatus corresponds to a voltage applied to a primary coil in the wireless power transmission apparatus, wherein a first magnitude of the received voltage is smaller than a second magnitude of a load voltage of the wireless power reception apparatus.

33. A wireless power transmission apparatus comprising:
at least one primary coil configured to transmit wireless power to at least one secondary coil of a wireless power reception apparatus; and
a power controller configured to
control transmission of the wireless power from the primary coil to the secondary coil of the wireless power reception apparatus,
receive, from the wireless power reception apparatus, first information indicating one or more reference control parameters for one or more load settings of a variable load of the wireless power reception apparatus,
receive, from the wireless power reception apparatus, second information indicating one or more voltages induced in a secondary coil of the wireless power reception apparatus,
determine an operating coupling factor for the wireless power reception apparatus based, at least in part on the second information,
determine an estimated load power for a load setting of the one or more load settings,
receive a reference voltage indicating a voltage requested by the load,
determine an operating control parameter based, at least in part, on the first information received from the wireless power reception apparatus, the operating coupling factor, the estimated load power, and the reference voltage, and
modify the wireless power based, at least in part, on the operating control parameter.

34. The wireless power transmission apparatus of claim 33, wherein the power controller is further configured to:
receive, from the wireless power reception apparatus, a measured load voltage indicating a voltage available to the load,
determine a voltage error based on a difference between the reference voltage and the measured load voltage, and
modify the operating control parameter based, at least in part, on the voltage error.

* * * * *